US012781712B2

(12) United States Patent
Sugitani

(10) Patent No.: US 12,781,712 B2
(45) Date of Patent: Nov. 3, 2026

(54) WIND POWER GENERATION DEVICE

(71) Applicant: IMADEST CORPORATION, Susono (JP)

(72) Inventor: Nobuyoshi Sugitani, Susono (JP)

(73) Assignee: IMADEST CORPORATION, Susono (JP)

( * ) Notice: Subject to any disclaimer, the term of this patent is extended or adjusted under 35 U.S.C. 154(b) by 92 days.

(21) Appl. No.: 18/995,414

(22) PCT Filed: Jul. 19, 2023

(86) PCT No.: PCT/JP2023/026454
§ 371 (c)(1),
(2) Date: Jan. 16, 2025

(87) PCT Pub. No.: WO2024/034342
PCT Pub. Date: Feb. 15, 2024

(65) Prior Publication Data

US 2026/0251125 A1 Aug. 27, 2026

(30) Foreign Application Priority Data

Aug. 8, 2022 (JP) ................................ 2022-126715

(51) Int. Cl.
*F03D 15/10* (2016.01)
*F03D 1/00* (2006.01)
(Continued)

(52) U.S. Cl.
CPC ......... *F03D 15/101* (2023.08); *F03D 1/0691* (2013.01); *F03D 1/101* (2023.08);
(Continued)

(58) Field of Classification Search
CPC ...... F03D 15/101; F03D 1/0691; F03D 1/101; F03D 9/25; F03D 15/207; F03D 80/881;
(Continued)

(56) References Cited

U.S. PATENT DOCUMENTS 5,083,039 A * 1/1992 Richardson ........... F03D 7/0272 290/55
8,604,636 B2 * 12/2013 Miyamoto ................ F03D 9/25 290/55
(Continued)

FOREIGN PATENT DOCUMENTS

JP H08-177711 A 7/1996
JP 2001-342942 A 12/2001
(Continued)

OTHER PUBLICATIONS

PCT/ISA/210, "International Search Report for PCT International Application No. PCT/JP2023/026454," Aug. 29, 2023.
Japan Patent Office, "Notification of Resons for Refusal for Japanese Patent Application 2022-126715," Oct. 14, 2022.

*Primary Examiner* — Eldon T Brockman
(74) *Attorney, Agent, or Firm* — Kreative IP Management LLC; Fuiyeong Kim

(57) ABSTRACT

A wind power generation device includes: a hub in which a hollow hole is formed; a blade fixed to the hub; a bearing that is disposed inside the hollow hole of the hub, an outer ring of which integrally rotating with the hub; a nacelle that includes a fixed portion to which an inner ring of the bearing is coupled and that rotatably supports the hub via the bearing; a rotation transmission mechanism that distributes and transmits the rotation of the hub to multiple systems; a generator installed for each system of the rotation transmission mechanism; and a tower that supports the nacelle in the air. The rotation transmission mechanism includes a large gear that integrally rotate with the hub, and a small gear, for each of the systems, that engage with the large gear.

11 Claims, 11 Drawing Sheets

(51) Int. Cl.

| | |
|---|---|
| ***F03D 1/06*** | (2006.01) |
| ***F03D 9/25*** | (2016.01) |
| ***F03D 15/00*** | (2016.01) |
| ***F03D 80/80*** | (2016.01) |

(52) U.S. Cl.
CPC ............. *F03D 9/25* (2016.05); *F03D 15/207* (2023.08); *F03D 80/881* (2023.08); *F05B 2220/706* (2013.01); *F05B 2240/61* (2013.01); *F05B 2260/40311* (2013.01)

(58) Field of Classification Search
CPC ............ F05B 2220/706; F05B 2240/61; F05B 2260/40311
See application file for complete search history.

(56) References Cited

U.S. PATENT DOCUMENTS

| | | | | |
|---|---|---|---|---|
| 8,636,615 | B2 * | 1/2014 | Suzuki | B23P 19/04 475/159 |
| 9,790,920 | B2 * | 10/2017 | Nohara | F16H 25/02 |
| 9,903,347 | B2 * | 2/2018 | Pedersen | F16H 1/26 |
| 11,274,655 | B2 * | 3/2022 | Nohara | F03D 17/00 |
| 2013/0172144 | A1 | 7/2013 | Suzuki et al. | |
| 2017/0298903 | A1 * | 10/2017 | Yu | F03D 15/00 |

FOREIGN PATENT DOCUMENTS

| | | | |
|---|---|---|---|
| JP | 2012-237230 | A | 12/2012 |
| JP | 2013-061031 | A | 4/2013 |
| JP | 5511968 | B2 | 6/2014 |
| JP | 2022150502 | A * | 10/2022 |

* cited by examiner

WIND POWER GENERATION DEVICE

CROSS-REFERENCE TO RELATED APPLICATIONS

This application is a national stage entry of International Application No. PCT/JP2023/026454, filed on Jul. 19, 2023, which claims priority to Japanese Patent Application No. 2022-126715, filed on Aug. 8, 2022, the entire disclosures of which are hereby incorporated by reference herein.

TECHNICAL FIELD

The present invention relates to a wind power generation device, and more particularly to the configuration of a horizontal type wind power generation device.

BACKGROUND ART

In a wind power generation device, blades are fixed to a hub, and when the blades catch wind, the hub rotates, and the rotation of the hub is transmitted to a generator to generate electricity. Wind power generation devices can be divided into horizontal types, in which the rotation shaft of the hub is arranged horizontally, and vertical types, in which the rotation shaft of the hub is arranged vertically. For example, types shown in schematic diagrams of FIGS. 10 and 11 are known as the horizontal type wind power generation device.

In one type of wind power generation device 100 shown in FIG. 10, a main shaft 104 is coupled to a hub 102 and rotatably supported by a bearing called a main shaft bearing 106, and the rotation of the hub 102 is transmitted to a speed increaser 108. The speed increaser 108 normally uses a planetary gear speed increase mechanism 110 in the first stage, and utilizes carrier input and solar output in order to obtain a large speed increase ratio. For the next speed-up, a two-stage parallel shaft gear speed increaser 112 is provided, and the total speed increase ratio is increased to about 100, and electricity is generated by a generator 114 (see, e.g., PATENT LITERATURE 1).

Another type of wind power generation device 200 shown in FIG. 11 is a so-called direct type in which the rotation of the hub 202 is directly transmitted to the generator 206 without speed increase. In the direct type, a bearing 204 is disposed inside the hub 202, and the outer ring side of the bearing 204 is transmitted to an outer rotor type generator 206 without speed increase. A magnet is attached to the rotor 208 of the generator 206. Although it has a simple structure, it uses a large amount of magnets, is an extremely expensive system, and is not suitable for large power generation (see, e.g., PATENT LITERATURE 2).

Generally speaking, wind energy mainly flows parallel to the ground or water surface, so horizontal wind turbines, which have the blades rotated horizontally to the wind, are the mainstream. In recent years, horizontal type wind power generation devices have become larger.

For example, while the maximum output of onshore wind power generation was mostly below 1 MW, in recent years, some with a capacity of 2 MW or more have appeared. We are now in an era where offshore wind power generation can generate 15 MW. Furthermore, floating wind power generation has also begun to be carried out offshore, where stronger winds can be expected. Since there are more areas of strong winds offshore than on land, it is predicted that offshore wind power generation will continue to increase in the future. From the perspective of global warming countermeasures and carbon neutrality, it is thought that wind power generation will continue to become larger.

Also, it has been proposed to provide a plurality of generators within a wind power generation device. For example, PATENT LITERATUREs 2 and 3 disclose a configuration in which a large gear is fixed to a main shaft coupled to a hub, a plurality of small gears are provided to engage with the large gear, and the rotation of each of the small gears is transmitted to a generator.

CITATION LIST

Patent Literature

[PATENT LITERATURE 1] JP 5511968 B2
[PATENT LITERATURE 2] JP H08-177711 A

SUMMARY OF THE INVENTION

Problem to be Solved by the Invention

Increasing the blade diameter to enlarge the horizontal type wind power generation device reduces the rotor speed and increases the torque, which leads to larger and heavier mechanisms placed inside the nacelle of the wind power generation device.

As the weight of the nacelle increases, the weight of the tower and other components also increases, and installation costs also increase. A large crane is needed to install the heavy nacelle on top of the tower, and in the case of offshore wind power generation, a large ship is needed to transport it.

In the case of floating mode, the increase in the weight of the mechanisms inside the nacelle leads to an increase in the size of the floating body. As the floating body becomes larger, there is also the issue of water depth, making it difficult to transport it from a normal port. In offshore wind power generation such as floating mode, the costs of repairs in the event of a malfunction and regular inspections are carried out offshore, far from land, and in recent years, these costs have far outweighed the manufacturing costs.

In other words, an increase in the size of a horizontal type wind power generation device leads to an increase in torque and weight, which increases the probability of failure, reduces the operating rate, and increases repair costs, resulting in higher costs.

The problems with the conventional technology will now be described in more detail.

FIG. 10 is a block diagram of two conventional types of wind power generation devices 100, 200. As shown in FIGS. 12A and 12B, the two conventional types transmit the wind energy obtained by the blades 101, 201 to the generators 114, 208 through a single path without branching, and therefore are not suitable for enlarging the wind power generation devices 100, 200.

When the size is increased, the torque increases in proportion to the 1.5-th power of the output, and the weight of the main parts that transmit the torque, such as the main shaft, the speed increaser, and the generator, also increases in proportion to the 1.5-th power of the output (hereinafter, this law will be referred to as the "1.5-th power law"). In addition, the increase in torque also increases the failure of mechanical parts such as bearings, and durability and maintenance costs become problems. Therefore, there are restrictions on increasing the output, and it is not easy to achieve it.

For example, if the output is increased from 10 MW to 20 MW, i.e., doubled, the main parts that are subject to stress, such as the main shaft, speed increaser, and generator, will weigh $2^{1.5}$=2.83 times as much if considered as similar shapes. This shows that the common sense that consolidating and enlarging reduces the weight and cost per unit of output does not apply not only to hydroelectric and thermal power plants but to almost all plants. This is the biggest problem.

Here, the 1.5-th power law will be explained in detail.

1. Blade Diameter and Rotation Speed

It outputs about 0.44 $kW/m^2$ per $m^2$. When calculating the blade diameter for an output of 1 MW, 2272.727 $m^2$ is required, so the blade diameter d is 53.79 m. The hub rotation speed is a constant speed at the tip of the blade, and 320 km/h is often used as this value. The hub rotation speed is 320/3.6/(n·d), which is 0.526 rps (31.56 rpm). Calculating the torque from the rotations, 1 MW is 302.59 kNm.

Next, calculate 20 MW in the same way. The blade diameter required is 45, 454.55 $m^2$, so the blade diameter d is 240.57 m, and the rotation speed is 0.11763 rps (7.056 rpm). The torque is 2,706.3 kNm, which is 89.44 times that of 1 MW. In other words, an increase in output leads to an increase in torque.

In conclusion, if the rated output is P (unit: MW), the rotation speed and torque can be calculated using the following equations 1 and 2.

$$\text{Rotational speed (rps)}=0.526\times P^{-0.5} \quad \text{(Equation 1)}$$

$$\text{Torque (kNm)}=302.59\times P^{1.5} \quad \text{(Equation 2)}$$

In other words, the rotation speed decreases in proportion to the −0.5-th power of the output, and the torque increases in proportion to the 1.5-th power of the output.

2. Torque, Size and Weight

It is necessary to reduce the torsional stress by increasing the diameter in response to an increase in torque. Since the torsional stress (shear stress) decreases in proportion to the cube of the diameter, by increasing the diameter by the ⅓ power, it is possible to withstand an increase in torque with a constant shear stress. In conclusion, weight increases in proportion to torque, and therefore weight is also proportional to the 1.5-th power of the output.

For example, if a 1 MW main shaft weighs 2.4 t, then weight=$2.4\times P^{1.5}$.

The law that weight is proportional to the 1.5-th power of output means that when torque is transmitted through a single path, such as not only the main shaft but also a speed increaser or generator, the weight of the part through which torque is transmitted cannot escape this law.

(Increase in Failure)

The planetary gear speed increase mechanism 110 of the wind power generation device 100 shown in FIG. 10 increases the speed with the solar output by the carrier input. The planetary carrier is usually installed with a roller bearing that supports the shaft of the planetary gear. This roller bearing is subject to an unbalanced load caused by both the revolution of the planetary gear around the sun axis and the rotation of the planetary gear, and is prone to a burn-in phenomenon called smearing. Generally, failures of the planetary gear mechanism are concentrated around the carrier axis, so the enlargement of the wind power generation device 100 promotes failures of the planetary gear speed increase mechanism 110.

Furthermore, the bearing 106 of the main shaft 104 of the wind power generation device 100 is similarly susceptible to smearing since it is subjected to not only the weight of the main shaft 104 but also fluctuating loads due to wind and stress in a cantilever state.

One way to reduce the weight of the main shaft 104 is to use aluminum instead of iron, but this is prone to metal fatigue, so a larger safety factor must be taken. Increasing the diameter and making it hollow also leads to weight reduction, but this has many drawbacks, such as the need to increase the diameter of the bearing 106.

(DIRECT DRIVE TYPE)

This law that weight is proportional to the 1.5-th power of output cannot be escaped even in the direct type wind power generation device 200 shown in FIG. 11. In the direct type, the rotation of the hub 204 is directly transmitted to the rotor of the generator 206 without using a main shaft. At first glance, it may seem that this is unrelated to stress and does not follow the 1.5-th power law.

However, even with the direct type, the rotation speed of the wind turbine also decreases as the output increases, so the diameter of the rotor of the generator becomes huge to compensate for this. Also, if magnets are used, the cost of the generator becomes enormous, making it unrealistic.

The rotation speed and torque can be calculated using the equations 1 and 2 already explained.

The generator 206 of the direct type wind power generation device 200 must handle a torque that increases by the 1.5-th power of the output. In general, the torque is proportional to the square of the rotor diameter of the generator 206 and is proportional to the length of the rotor. The amount of power generated by the generator 206 is proportional to the volume.

Therefore, the volume of the rotor increases in proportion to the 1.5-th power of P (output). Since weight is proportional to volume, the weight of the generator 206 also increases in proportion to the 1.5-th power in the direct type.

As described above, in wind power generation devices with a speed increase mechanism or direct-type wind power generation devices, an increase in output will result in an increase in the weight of the nacelle greater than the increase in output, because torque is proportional to the 1.5-th power of the output, and there is a risk of a cost increase greater than the increase in output.

In view of the above circumstances, an object of the present invention is to provide a wind power generation device that can be increased in size while suppressing increases in costs.

Means for Solving the Problem

In order to solve the above problems, the present invention provides a wind power generation device configured as follows.

The wind power generation device is equipped with:

(a) a hub in which a hollow hole is formed;

(b) a blade fixed to the hub;

(c) a bearing including an outer ring and an inner ring that are rotatable relative to one another, the bearing being disposed inside the hollow hole of the hub such that the outer ring integrally rotates with the hub;

(d) a nacelle including a fixed portion to which the inner ring of the bearing is coupled and rotatably supporting the hub via the bearing;

(e) a rotation transmission mechanism that distributes and transmits the rotation of the hub to multiple systems;

(f) a generator installed for each of the systems of the rotation transmission mechanism, to which the rotation is transmitted from the rotation transmission mechanism; and (h) a tower that supports the nacelle in the air.

The rotation transmission mechanism includes:

(d-i) a large gear that integrally rotates with the hub; and (d-ii) a small gear that engages with the large gear, for each of the systems.

The large gear of the rotation transmission mechanism has internal teeth or external teeth.

The small gear of the rotation transmission mechanism has external teeth that engages with the internal teeth or the external teeth of the large gear of the rotation transmission mechanism.

The large gear of the rotation transmission mechanism has a through hole that communicates with the hollow hole of the hub, and the fixed portion of the nacelle is coupled to a machine base of the nacelle via the through hole.

In the above configuration, the torque is distributed to multiple systems by the large gear and multiple small gears of the rotation transmission mechanism, and electricity is generated by multiple generators. This makes it possible to reduce the weight of the entire system distributed by the rotation transmission mechanism compared to when torque is not distributed and electricity is generated by only one generator. In addition, the large gear that integrally rotates with the hub does not need to be large if the number of small gears that engage with the large gear is increased. Therefore, with the above configuration, the weight of the mechanism inside the nacelle of the wind power generation device can be reduced compared to conventional wind power generation devices.

In addition, by distributing the torque, the torque acting on the bearings of each system of the rotation transmission mechanism is also reduced, making the bearings less likely to fail. Because the outer ring of a bearing mounted on the inside of the hub rotates with the hub, it is easier to supply lubricating oil and less likely to fail than when a bearing is mounted on the outside of the hub, i.e., when the outer ring of the bearing is stationary.

Therefore, the size can be increased while suppressing increases in costs.

Preferably, the wind power generation device includes: (g) a converter installed for each generator, functioning as an AC-DC converter to convert the alternating current generated by the generator into direct current; and (h) a common battery to which the direct current is supplied from each of the converters.

In this case, the battery is charged by direct current supplied from the converter and can accumulate energy generated by multiple generators.

Preferably, the wind power generation device further includes a control device that controls the converter so as to drive the generator by the converter and generate power as regenerative energy by the generator.

In this case, the rotational fluctuation of the hub can be suppressed, and smearing of the bearing can be suppressed.

Preferably, the wind power generation device further includes (k) a housing that accommodates the rotation transmission mechanism and the generator.

The nacelle further includes a first t longitudinal member and a second longitudinal member fixed to the machine base. The fixed portion is coupled to the machine base via the first longitudinal member. The housing is fixed to the first longitudinal member and the second longitudinal member so as to transmit at least a portion of a load acting on the nacelle from the hub.

In this case, the housing can be used as a strength member of the nacelle.

Preferably, the rotation transmission mechanism uses a planetary gear mechanism (d-iii) constituted by a screw-like gear for the bearing of a rotating body whose speed is increased in the rotation transmission mechanism.

In this case, the engaging ratio can be ensured and rotation can be transmitted without slippage, making it possible to suppress smearing of the bearing.

That is, a planetary gear mechanism constituted of screw-like gears has a small number of teeth and a large module, which is reference pitch circle/number of teeth, and therefore is strong. Furthermore, even if the overlapping engaging ratio of screw-like gears is increased, engaging occurs only in the vicinity of the reference pitch circle diameter, and the frontal engaging ratio is reduced, a sufficient engaging ratio can be ensured and slippage on the tooth surface can be extremely reduced. Furthermore, thrust forces can be cancelled by making the tooth twisted in opposite directions. Thus, extremely strong and efficient engaging can be achieved. In this way, a planetary gear mechanism constituted of screw-like gears can ensure the engaging ratio and transmit rotation without slippage, so that when used in a bearing, smearing of the bearing can be suppressed.

Preferably, for each of the systems of the rotation transmission mechanism, the small gear of the rotation transmission mechanism, the rotation transmission mechanism, the generator, and the converter are all or partially coupled to each other to form an assembly.

Constructing the assembly in a modular manner reduces costs and improves reliability.

Preferably, the rotation transmission mechanism includes a first planetary gear mechanism and a second planetary gear mechanism constituted by (d-iv) screw-like gears. The sun gears of the first planetary gear mechanism and the second planetary gear mechanism are coupled to each other and rotate together. The planetary gears of the first planetary gear mechanism and the second planetary gear mechanism are coupled to each other and rotate together. The rotation of the small gear of the rotation transmission mechanism is transmitted to an internal gear of the first planetary gear mechanism. The internal gear of the second planetary gear mechanism is fixed to the nacelle. The rotation of the sun gear of the second planetary gear mechanism is transmitted to the generator.

By providing an external gear that engages with the ring gear to distribute and increase the rotation and torque on the internal gear of the first planetary gear mechanism, it is possible to realize an extremely compact and lightweight rotation transmission mechanism.

Preferably, the wind power generation device is configured so that personnel can enter the nacelle from the bottom of the nacelle and pass through the hollow hole in the hub to reach a position in the hub opposite the blade.

In this case, major inspections can be carried out safely as they pass through the inside of the nacelle, without any risk of falling.

In a preferred embodiment, the large gear of the rotation transmission mechanism has the internal teeth rather than the external teeth.

In this case, multiple small gears that engage with the internal teeth of the large gear are arranged inside the large gear of the rotation transmission mechanism. Therefore, the radial dimension can be made smaller than when the large gear of the rotation transmission mechanism has external teeth and multiple small gears that engage with the external teeth of the large gear are arranged outside the large gear. Also, since the lubricating oil accumulates at the bottom of the internal teeth of the large gear of the rotation transmission mechanism, the lubricating oil can be easily and reliably supplied to the tooth surfaces of the large gear and small gear that engage with each other, compared to when the speed is increased by distributing by the large gear that has external teeth, and the small gear.

In another preferred aspect, the large gear of the rotation transmission mechanism has the internal teeth rather than the external teeth. The internal teeth of the large gear of the rotation transmission mechanism include first and second screw-like internal teeth that are internal teeth of screw-like gears twisting in opposite directions to each other. The external teeth of the small gear of the rotation transmission mechanism include first and second screw-like external teeth that are external teeth of screw-like gears twisting in opposite directions to each other. The first screw-like internal teeth and the first screw-like external teeth engage with each other, and the second screw-like internal teeth and the second screw-like external teeth engage with each other.

In this case, the thrust force acting on the rotation transmission mechanism can be suppressed. Also, it is easy to configure the rotation transmission mechanism so that no excessive force acts on the engaging of the large gear and small gear.

More preferably, a planetary gear mechanism constituted of a screw-like gear is used for the bearing of the rotation shaft of the small gear of the rotation transmission mechanism.

In this case, the engaging ratio can be ensured and rotation can be transmitted without causing slippage, thereby suppressing smearing of the bearing.

Advantageous Effects of the Invention

According to the present invention, it is possible to provide a wind power generation device that can be increased in size while suppressing increases in costs.

MODES FOR CARRYING OUT THE INVENTION

Hereinafter, an embodiment of the present invention will be described with reference to the drawings.

Example 1

Figure 1:
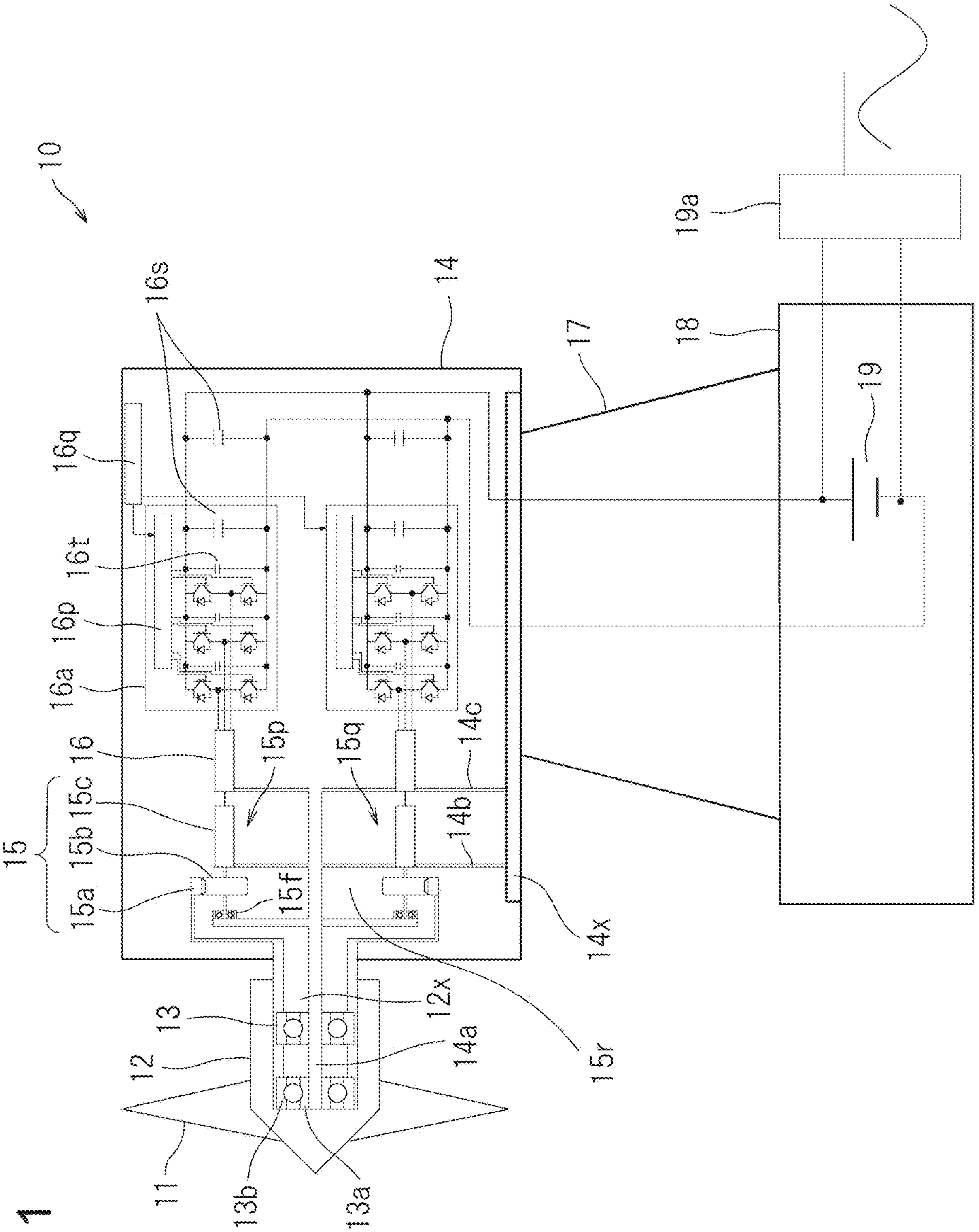
FIG. 1 is a schematic diagram of a wind power generation device (Example 1).

First, an overview of a wind power generation device 10 according to an embodiment of the present invention will be described with reference to FIG. 1. FIG. 1 is a schematic diagram of the wind power generation device 10.

As shown in FIG. 1, a wind power generation device 10 includes a hub 12, blades 11 fixed to the hub 12, a nacelle 14 that rotatably supports the hub 12 via bearings 13, and a tower 17 that supports a machine base 14*x* of the nacelle 14. The wind power generation device 10 further includes a floating body 18 to which the base end of the tower 17 is fixed in offshore wind power generation, while the base end of the tower 17 is fixed to the land in onshore wind power generation. The tower 17 supports the nacelle 14 in the air.

A hollow hole 12*x* is formed in the hub 12, and a bearing 13 is disposed in the hollow hole 12*x*. The bearing 13 includes an outer ring 13*b* and an inner ring 13*a* that are rotatable relative to one another, and the outer ring 13*b* is fixed to the hub 12, and the inner ring 13*a* is fixed to a fixed portion 14*a*. The fixed portion 14*a* is fixed to a machine base 14*x* of the nacelle 14.

A rotation transmission mechanism 15 that distributes the rotation of the hub 12 to multiple systems 15*p*, 15*q* and increases the speed is installed in the nacelle 14. Although two systems 15*p*, 15*q* are illustrated in FIG. 1, three or more systems may be provided.

The rotation transmission mechanism 15 includes a ring gear 15*a* that integrally rotates with the hub 12, and a plurality of external gears 15*b* that engage with the ring gear 15*a*. Each of the plurality of systems 15*p*, 15*q* of the rotation transmission mechanism 15 includes one external gear 15*b*, and preferably includes a speed increase mechanism 15*c*.

The ring gear 15*a* has a through hole 15*r* that communicates with the hollow hole 12*x* of the hub 12, and as will be described later, a fixed portion 14*a* of the nacelle 14 is coupled to a machine base 14*x* of the nacelle 14 via the through hole 15*r*.

The rotation transmission mechanism 15 may be configured such that, instead of the ring gear 15*a*, an external gear that integrally rotates with the hub 12 is provided, and multiple external gears 15*b* engage with this external gear. In this case, a through hole that communicates with the hollow hole 12*x* of the hub 12 is formed in the external gear provided in place of the ring gear 15*a*, and the fixed portion 14*a* of the nacelle 14 is coupled to the machine base 14*x* of the nacelle 14 via this through hole.

A generator 16 is provided in the nacelle 14 for each of the systems 15 *p* and 15 *q* of the rotation transmission mechanism 15.

Energy generated by each generator is converted to direct current by a converter 16*a* installed for each generator, and the direct current converted by each converter 16*a* is supplied to a common battery 19 and temporarily stored in the battery 19. By using a storage battery for the battery 19, the electrical energy generated by the multiple generators 16 can be accumulated without using a conversion device such as a DC-DC converter. The battery 19 also serves as a power source for the converter 16*a*.

The converter 16*a* is PWM controlled by a drive pulse generator 16*p*, and adjusts the load of the generator 16 to control the rotation and load of the blades 11. Since there are multiple sets of generators 16 and converters 16*a*, a power generation command device 16*q* sends a control signal to the drive pulse generator 16*p* to command the load of each generator 16 and control the amount of power generation.

In other words, the drive pulse generator 16*p* and the power generation command device 16*q* are a control device that controls the converter 16*a*, and perform control so that the generator 16 is driven by the converter 16*a* and the generator 16 generates power as regenerative energy.

In wind power generation, it is required to increase the total amount of power generation by generating power from a light breeze over a wide range. The generators 16 can be skewed to reduce the detent torque and facilitate rotation from a standstill. Furthermore, if only one of the multiple generators 16 is controlled to generate power, the load is small and power can be generated from a light breeze. In other words, by changing the number of generators 16 that act as a load, i.e., the number of generators 16 that generate power, a wide range of wind power can be handled.

The converter 16*a* generates power as regenerative energy by switching the IGBTs and the like to flow the alternating current generated by the generator 16 to the battery 19 at appropriate timing. The converter 16*a* also functions as an inverter in the same circuit, so that the generator 16 can be driven like a motor to rotate the blades 11 by applying the voltage of the battery 19 to the generator 16 at appropriate timing.

The weaker the wind, the higher the frequency and the more suddenly the wind stops, so a weak breeze does not necessarily cause the blades 11 in a stopped state to start rotating. However, once the blades 11 start rotating, they can continue to rotate even in a weak breeze that would not rotate the blades 11 in a stopped state. This is because the coefficient of kinetic friction is smaller than the coefficient of static friction, and the coefficient of kinetic friction becomes smaller as the rotation speed increases.

Therefore, the power generation command device 16*q* drives the blades 11 using the converter 16*a*, adjusts the rotation speed to an appropriate number according to the wind volume, and then commands the converter 16*a* to perform regeneration, thereby generating electricity as regenerative energy.

Since the battery 19 cannot store a large amount of energy, the energy of the battery 19 is converted to alternating current by a DC-AC converter 19*a* and then transmitted. The DC-AC converter 19*a* can connect the batteries 19 in parallel if the wind turbines have the same battery specifications, so the energy of multiple wind power generation devices 10 can be converted to alternating current by a single DC-AC converter 19*a* and transmitted.

Since the battery 19 is required to have improved maintainability, it is most reasonable to install it on the floating body 18, which is easily accessible. In the case of onshore power generation, the battery 19 is placed under the tower 17 or on land.

Although not shown, a separate battery may be disposed for each generator 16 within the nacelle 14. In this case, the converter 16*a* and the battery may be incorporated together with the generator 16 into an assembly 40 or 42, which will be described later.

When multiple converters are PWM controlled, asynchronous noise may affect the other converters and destroy the IGBTs, etc., so a smoothing capacitor 16*s* is inserted between the power supply and ground of the converter.

In addition, the IGBTs of the converter are often configured with the same N-type for H and L. In that case, the H side must be driven with a voltage obtained by adding the voltage for driving the IGBTs to the voltage connected to the coil of the generator 16. In other words, since it must be driven with a voltage that is susceptible to noise, a snubber capacitor 16*t* is inserted between the power supply ground of the IGBT to remove so-called high-frequency ringing noise.

The external gear 15*b* that engages with the ring gear 15*a* is rotatably fixed at both ends via bearings to a portion that is integrated with the bottom of the nacelle 14 (machine base 14*x*), for example by an assembly 44 described later.

The components integrated with the bottom of the nacelle (machine base 14*x*) are the inner ring 13*a* of the bearing 13, the bearing 15*f* of the external gear 15*b*, the speed increase mechanism 15*c* at the rear end thereof, the generator 16, the converter 16*a*, etc. Since there are multiple sets of the speed increase mechanism 15*c*, the generator 16, and the converter 16*a* due to distribution, integrating them, i.e., modularizing them, like assemblies 40 and 42 described below, allows the same items to be manufactured, costs to be reduced, and they are easy to handle.

Modules such as the speed increase mechanism 15*c*, the generator 16, and the converter 16*a* are connected to plate-shaped longitudinal members 14*b* and 14*c*, which serve as strength members against the wind force acting on the blades 11 and the weight of the blades 11 and the hub 12 themselves.

The specific configuration of the wind power generation device 10 will be further described.

Figure 2B:
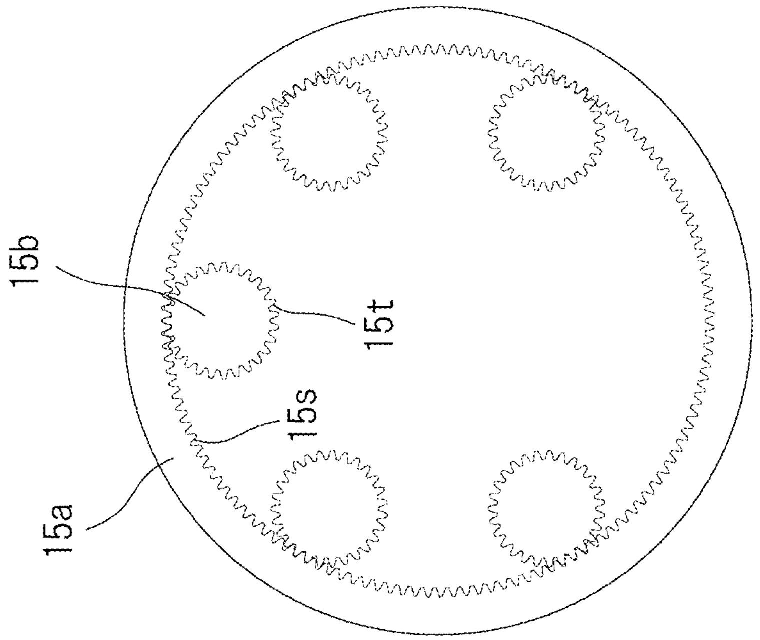
FIGS. 2A and 2B are explanatory diagrams of a wind power generation device (Example 1).
Figure 2A:
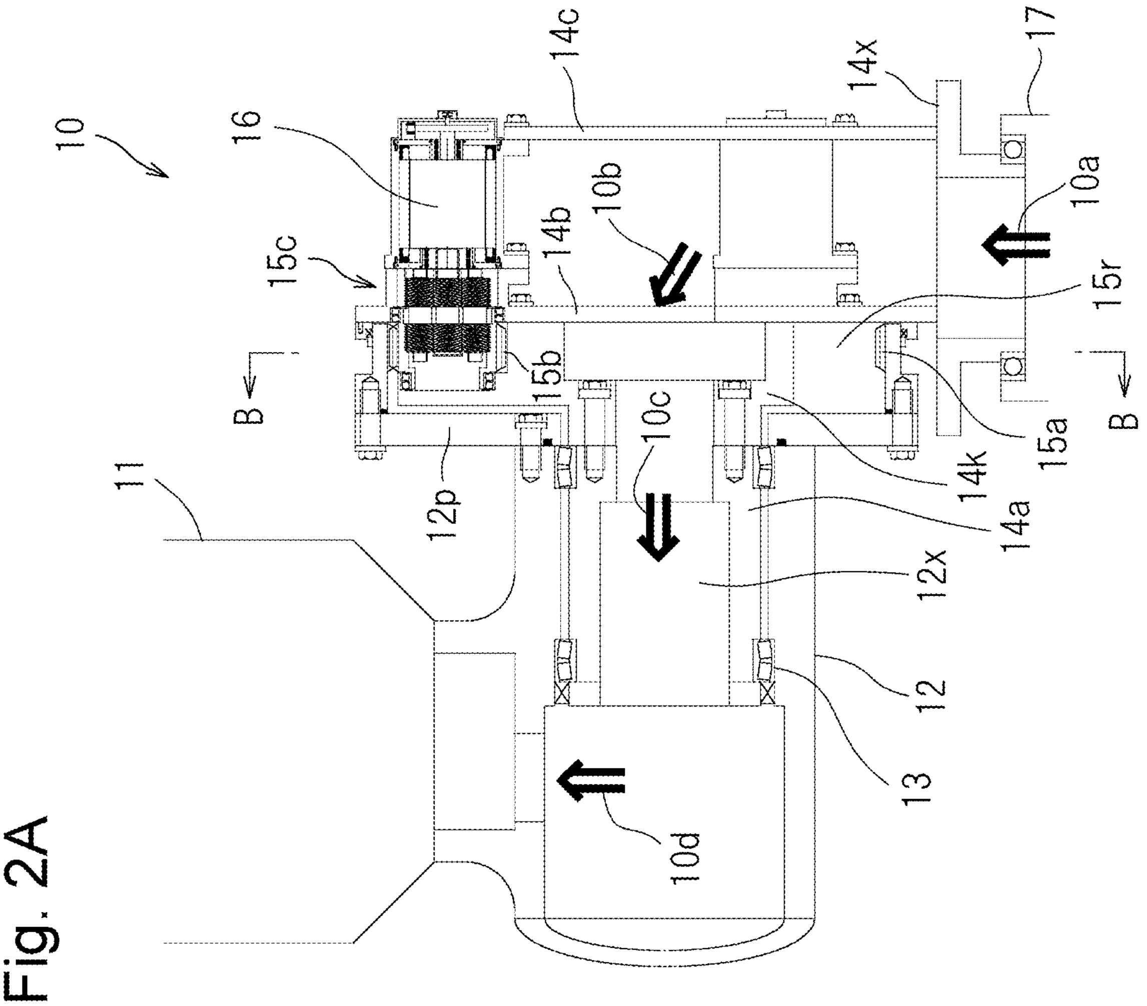

FIGS. 2A and 2B are cross-sectional diagrams of the main part of the wind power generation device 10. FIG. 2B is a cross-sectional diagram of the main part taken along line B-B in FIG. 2A. As shown in FIGS. 2A and 2B, a machine base 14*x* (nacelle base) of the nacelle 14 is supported at the tip of the tower 17 so as to be rotatable.

One end of the hub 12 protrudes from a housing (not shown) of the nacelle 14, and the blades 11 are fixed to this protruding end. The blades 11 are fixed to the hub 12 so as to extend radially from the center of the hub 12 and to be perpendicular or nearly perpendicular to the rotation center line of the hub 12.

A hollow hole 12*x* is formed in the hub 12 from the other end side, and a bearing 13 is disposed in the hollow hole 12*x*. The bearing 13 has an outer ring 13*b* fixed to the hub 12 and integrally rotates therewith, and an inner ring 13*a* fixed to a fixed portion 14*a*. The fixed portion 14*a* is coupled to a machine base 14*x* via a connecting member 14*k* that passes through a through hole 15*r* of the ring gear 15*a* and a first longitudinal member 14*b*, and is stationary with respect to the outer ring 13*b* of the bearing 13.

A disk-shaped mounting member 12*p* with an open center is fixed coaxially to the hub 12 on the other end face of the hub 12, and a ring gear 15*a* having internal teeth is fixed coaxially to the hub 12 along the outer periphery of the mounting member 12*p*.

As shown in FIG. 2B, the ring gear 15*a* has internal teeth 15*s*, and the external gear 15*b* has external teeth 15*t*. The number of teeth of the ring gear 15*a* is greater than the number of teeth of the external gear 15*b*. In other words, the ring gear 15*a* is a large gear, and the external gear 15*b* is a small gear. A plurality of external gears 15*b* (five in FIG. 2B) are arranged inside the ring gear 15*a* so that the external teeth 15*t* of the external gear 15*b* engages with the internal teeth 15*s* of the ring gear 15*a*. A speed increase mechanism 15*c* and a generator 16 are coupled coaxially to each external gear 15*b*, in that order.

The ring gear 15*a*, the external gear 15*b*, and the speed increase mechanism 15*c* constitute a rotation transmission mechanism 15 that accelerates the rotation of the hub 12 and transmits it to the generator 16. The rotation transmission mechanism 15 distributes torque via the multiple external gears 15*b* and transmits it to the generator 16. It is possible to omit the speed increase mechanism 15*c* of the rotation transmission mechanism 15.

In FIGS. 2A and 2B, the wind power generation device 10 is configured as show by arrows 10*a* to 10*d* so that an operator can enter the nacelle 14 from a machine base 14*x* at the bottom of the nacelle 14, pass through a hollow hole 12*x* in the hub 12, and reach a position facing the blades 11 inside the hub 12. In more detail, through holes that allow an operator to pass through are formed in the members that configure the nacelle 14 (i.e., the machine base 14*x*, the longitudinal members 14*b*, the connecting members 14*k*, and the fixing parts 14*a*).

Since the rotation transmission mechanism 15 is disposed above the bottom (machine base 14*x*) of the nacelle 14, an opening is provided in the machine base 14*x* at the bottom of the nacelle 14, and the structure is such that the nacelle can be accessed from the top of the tower via the stairs or elevator in the tower 17. Since the hub 12 has a hollow hole 12*x*, it can be made into a cylindrical shape that allows access to the interior, and is also configured to allow access to the pitch control unit installed at the base end of the blade 11. Since it passes through the inside of the nacelle 14, there is no risk of falling, and major inspections can be performed safely.

Figure 3:
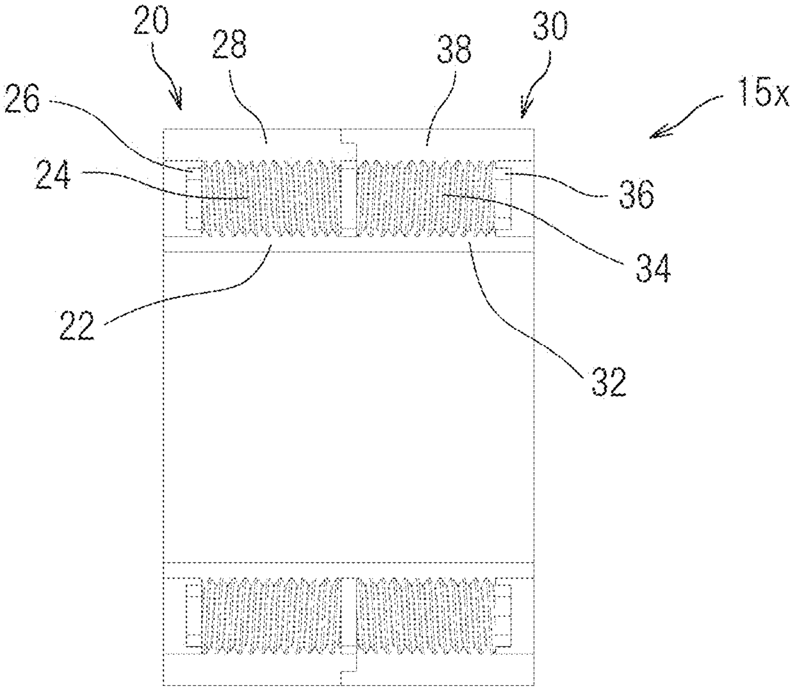
FIG. 3 is an explanatory diagram of a bearing (Example 1).

FIG. 3 is an explanatory diagram of the bearing 15*x* of the rotation transmission mechanism 15. As shown in FIG. 3, the bearing 15*x* includes first and second planetary gear mechanisms 20, 30 configured with screw-like gears. The first and second planetary gear mechanisms 20, 30 include sun gears 22, 32, planetary gears 24, 34, planet carriers 26, 36, and internal gears 28, 38, respectively. Note that a helical gear or a cogwheel whose tooth trace extends one revolution or more, i.e., 360 degrees or more, around the central axis of rotation is called a screw-like gear.

For example, in a rotation transmission mechanism 15 without a speed increase mechanism 15*c*, the rotation shaft of the external gear 15*b* is coupled to the sun gear 22 of the first planetary gear mechanism 20, the rotation shaft of the generator 16 is coupled to the second sun gear 32, the internal gear 28 of the first planetary gear mechanism 20 is coupled to the first longitudinal member 14*b* of the nacelle 14, and the internal gear 38 of the second planetary gear mechanism 30 is coupled to the first longitudinal member 14*b* of the nacelle 14.

The first and second planetary gear mechanisms 20, 30 constituted of screw-like gears are disclosed in Japanese Patent No. 4025806. FIG. 1 of this patent shows a mechanism for engaging gear members in which a spur gear and a screw-like gear are arranged coaxially. This mechanism can function as a bearing, but since it uses a spur tooth, the force in the axial direction is concentrated on the spur tooth, resulting in poor durability. Therefore, in this patent, the planetary gears are constructed using gears with the same number of teeth, since constructing a planetary gear mechanism using screw-like gears with different directions would function as a bearing. The mechanism disclosed in FIG. 14 of Japanese Patent No. 4025806, except for the spur gear, is used as a bearing for the speed-up portion of the wind power generation device 10.

Specifically, the sun gears 22, 32 are five-thread, i.e., five-teeth screw-like gears with different twist directions. The sun gears 22, 32 are formed as one member. The planetary gears 24, 34 are one-thread, i.e., one-tooth screw-like gears with different twist directions. The internal gears 28, 38 are seven-thread, i.e., seven-teeth screw-like gears with different twist directions. The internal gears 28, 38 are divided into two, which are coupled together and integrated by shrink fitting. The number of planetary gears 24, 34 arranged is 12.

These screw-like gears are involute gears with a large helix angle. The reference pitch circle diameter/number of teeth is called a module, and the larger the module, the stronger the gear. Screw-like gears can have a small number of teeth, so they have a large module and are therefore extremely strong. In addition, screw-like gears are excellent as bearings because they can withstand loads not only in the radial direction but also in the axial direction.

In addition, because rotation is transmitted by engaging gears, i.e., because the mechanism always rotates, smearing can be suppressed. Therefore, it is extremely effective as a bearing after speed-up of wind power generation, and can reduce mechanical failures.

Figure 4:
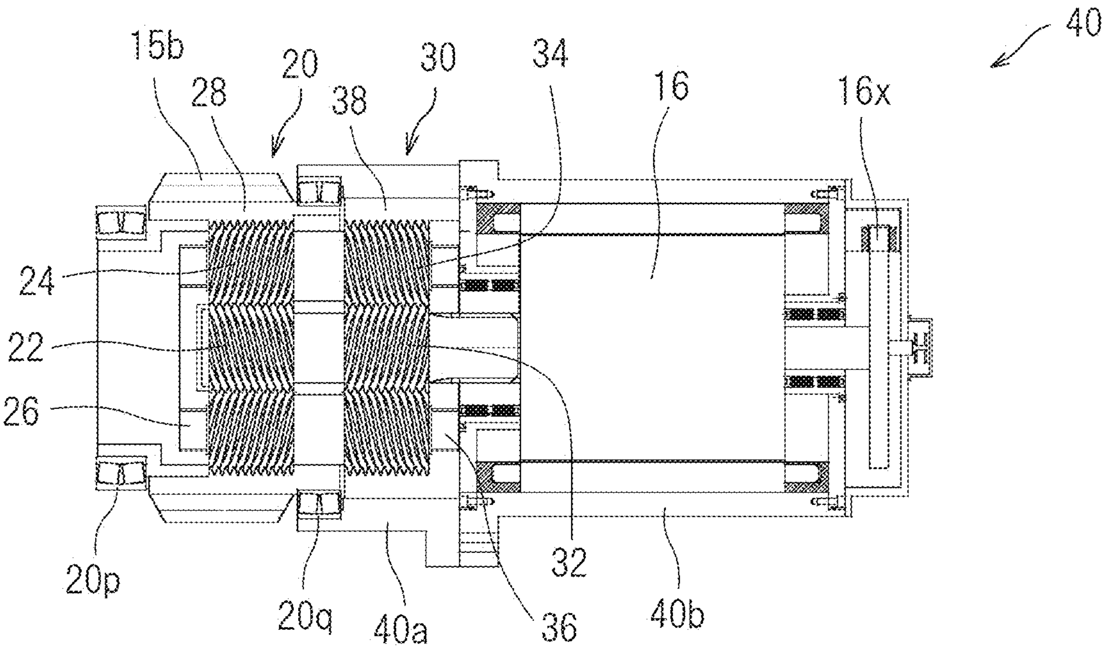
FIG. 4 is an explanatory diagram of an assembly (Example 1).

Next, the rotation transmission mechanism 15 including the speed increase mechanism 15*c* will be described. FIG. 4 is an explanatory diagram of an assembly 40 including the rotation transmission mechanism 15. As shown in FIG. 4, the assembly 40 is integrated by coupling together the external gear 15*b* of the rotation transmission mechanism 15, the first and second planetary gear mechanisms 20, 30 which are the speed increase mechanism 15*c*, the generator 16, and the brake 16*x*. The assembly 40 may include a converter 16*a*. The first and second planetary gear mechanisms 20, 30 include sun gears 22, 32, planetary gears 24, 34, planetary carriers 26, 36, and internal gears 28, 38, respectively.

The external gear 15*b* is formed along the outer circumferential surface of the internal gear 28 of the first planetary gear mechanism 20, and bearings 20*p*, 20*q* are arranged on both axial sides of the external gear 15*b*. This makes it possible to realize the ultimate miniaturization and weight reduction of the rotation transmission mechanism 15.

That is, when normal planetary gear speed increasers 20*a*, 30*a* are provided in two stages to increase the speed as in Modification Example 1 described later, the torque decreases due to the increase in speed, so the sun gear 32*a* which is the output end of the second stage can have a smaller diameter than the sun gear 22*a* which is the output end of the first stage. However, the portion with a small speed increase ratio needs to have a larger diameter, which places restrictions on the shapes of the portions such as the internal gears 28*a*, 38*a* which have a margin for shear stress, making it impossible to realize ultimate miniaturization and weight reduction.

In contrast, if the first and second planetary gear mechanisms 20, 30 are constructed using screw-like gears, it is possible to increase the speed all at once. If the speed increase ratio is the same, the diameter of the sun gears 22, 32 will be equal to the diameter of the sun gear 32*a* connected to the second stage 30*a* generator of the normal planetary gear speed increasers 20*a*, 30*a*, and in the differential planetary gear mechanisms 20, 30, the speed increase ratio is not affected by the number of teeth of the planetary gears 24, 34 and the sun gears 22, 32, i.e., the reference pitch circle diameter.

Therefore, when the internal gear 28 is used as the input, an external gear 15*b* that engages with the ring gear 15*a* to distribute rotation and torque and increase the speed can be provided on the internal gear 28. As a result, the speed increase mechanism 15*c* can be made extremely small and lightweight.

By configuring the assembly 40 into a module, it is possible to mass-produce the same assembly 40, thereby reducing manufacturing costs. For example, when the output is 20 MW and 30 MW, the same module is used, and the number of modules is changed according to the output.

Using the same assembly 40 increases the reliability of the assembly 40 and significantly reduces life cycle costs.

Moreover, a bench test can be performed on the assembly 40 to improve the reliability of the assembly 40. For example, if the wind power generation device 10 includes four assemblies 40, durability tests of the assemblies 40 can be performed with a small amount of energy by setting two assemblies 40 to driving mode and the other two to regenerative power generation mode. Such durability tests improve the reliability of the assembly 40.

The assembly 40 has a first housing 40*a* surrounding the second planetary gear mechanism 30 and a second housing 40*b* housing the generator 16, the brake 16*x*, etc. The housings 40*a*, 40*b* are coupled to each other and disposed between the first and second longitudinal members 14*b*, 14*c* fixed to the machine base 14*x* of the nacelle 14, as shown in FIG. 2A. The first housing 40*a* is fixed to the first longitudinal member 14*b*, and the second housing 40*b* is fixed to the second longitudinal member 14*c*. The first and second housings 40*a*, 40*b* are fixed to the nacelle so as to transmit at least a part of the load acting from the hub 12 to the nacelle 14, and can be used as strength members of the nacelle.

By using the housings 40*a*, 40*b* of the speed increase mechanism 15*c* and the generator 16 as strength members of the nacelle 14, it is possible to suppress an increase in the weight of the nacelle 14. The housings 40*a*, 40*b* of the speed increase mechanism 15*c* and the generator 16 are often cylindrical, which is an optimal shape for use as strength members.

Modification Example 1

The first and second planetary gear mechanisms 20, 30 of the speed increase mechanism 15*c* of the rotation transmission mechanism 15 may be configured similarly to the differential planetary gear mechanism disclosed in Japanese Patent No. 4,012,940.

Figure 13:
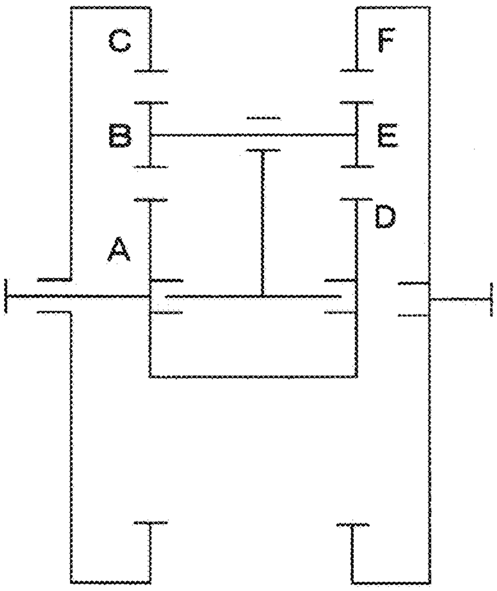
FIG. 13 is a skeleton diagram of a differential planetary gear mechanism.

FIG. 13 is a skeleton diagram of a differential planetary gear mechanism. As shown in FIG. 13, the differential planetary gear mechanism includes one set of planetary gear mechanisms including a sun gear A, a planetary gear B, and an internal gear C, and another set of planetary gear mechanisms including a sun gear D, a planetary gear E, and an internal gear F. The sun gears A and D of the two sets of planetary gear mechanisms are connected to each other and rotate together. The planetary gears B and E of the two sets of planetary gear mechanisms are connected to each other and rotate together. Only the internal gears C and F of the two sets of planetary gear mechanisms are not connected to each other and can rotate relative to each other.

The numbers of teeth of gears A, B, C, D, E, and F are Za, Zb, Zc, Zd, Ze, and Zf, respectively. When the input is the internal gear C and the output is the sun gear E, the reduction ratio K is given by the following equation 3.

$$K=(Za+Zc)\cdot Zf/(Za\cdot Zf-Zd\cdot Zc) \quad \text{(Equation 3)}$$

Since the differential planetary gear mechanism is used for speed increase, the input and output are interchanged, with the input being the internal gear F and the output being the sun gear A. In this case, the speed increase ratio is 1/K.

The differential planetary gear mechanism is configured using screw-like gears as disclosed in Japanese Patent No. 4025806. That is, as shown in FIG. 4, the first and second planetary gear mechanisms 20, 30 are configured using screw-like gears. The first and second planetary gear mechanisms 20, 30 each include a sun gear 22, 32, a planetary gear 24, 34, a planetary carrier 26, 36, and an internal gear 28, 38. The sun gears 22, 32 are coupled to each other and rotate together. The planetary gears 24, 34 are coupled to each other and rotate together.

In involute gears, if the tooth normal pitch: $Pb_n$ shown in the following equation 4 is equal, gears can be engaged.

$$Pb_n=\pi\cdot d_1\cdot\cos\alpha_t\cdot\cos\beta/Z \quad \text{(Equation 4)}$$

Here, Z is the number of teeth, $d_1$ is the reference pitch circle diameter, $\alpha_t$ is the front pressure angle, and β is the reference pitch cylinder helix angle.

In the case of a screw-like gear with a multiple thread structure, if the thread pitch (i.e., the pitch between adjacent threads) is P and the number of threads is n, then lead=n·P. Therefore, in a screw-shaped planetary gear mechanism, the number of threads equals the number of teeth.

In a screw-like gear, the pitch P cannot be changed, but the number n of threads of the lead can be changed, and the helix angle β is determined.

Since the teeth engage according to the number of teeth (n), in order to engage the teeth without changing the reference pitch, the front pressure angle can be changed to allow engaging in the same way as involute gears.

The following Table 1 shows an example of the design of the number of teeth.

TABLE 1

| | Planetary gear mechanism with fixed internal teeth | | | Planetary gear mechanism with internal teeth as input | | |
|---|---|---|---|---|---|---|
| | Sun | Planet | Internal teeth | Sun | Planet | Internal teeth |
| Number of teeth symbol | Za | Zb | Zc | Zd | Ze | Zf |
| Number of teeth (multiplier) | 7 | 7 | 23 | 8 | 8 | 22 |
| Speed increase ratio | | | −22 | | | |

In the example of Table 1, the ratio of the reference pitch circle diameters of both screw-like gears is equal, i.e., sun:planet:internal teeth=1:1:3. The shapes of the axial threads are also equal.

The number of teeth of the internal gear is usually the sum of twice the number of teeth of the sun gear and the planetary gear, so Zc=Za+2·Zb=21, Zf=Zd+2·Ze=24, but Zc is set to 21+2=23, and Zf is set to 24−2=22. The speed increase ratio is −22, and the sun gear has a speed increase ratio of 22 times the rotation input of the internal gear when rotating in the opposite direction.

The first planetary gear mechanism 20 is composed of a screw-like gear with the number of teeth of the "planetary gear mechanism with internal teeth as input" in Table 1, and the second planetary gear mechanism 30 is composed of a screw-like gear with the number of teeth of the "planetary gear mechanism with fixed internal teeth" in Table 1.

A differential planetary gear mechanism constituted of screw-like gears has a large overlapping engaging ratio and a small number of teeth, so the front module (reference pitch circle/number of teeth) is larger and engagement with extremely high strength is achieved. In addition, as shown in Japanese Patent No. 4025806, the engaging between the screw-like gears functions as a bearing with high radial and axial strength. Therefore, the sun gears 22, 32 of the first and second planetary gear mechanisms 20, 30 can be held without the use of bearings.

Failures in planetary gear mechanisms mainly occur in the mechanisms around the planetary carrier. If bearings for planetary gears can be provided inside the planetary carrier, lubrication with oil becomes difficult, and malfunctions may occur due to lack of oil. In the first place, malfunctions are likely to occur when the planetary carrier is used for input and output. The force transmitted by the planetary carrier is a mixture of the force associated with the rotation that turns the planetary gears and the force associated with the revolution of the planetary gears around the sun gear. When the sun gear is accelerated using the planetary carrier as input, the force of the revolution of the planetary carrier promotes the rotation of the planetary gears. As a result, a large force acts on the bearing of the planetary carrier, causing localized burn-in such as smearing.

In contrast, in the differential planetary gear mechanisms 20, 30 constituted of screw-like gears, the input section to which the rotational torque from the external gear 15*b* is transmitted is the internal gear 28 of the first planetary gear mechanism 20, and the output is the sun gear 32 of the second planetary gear mechanism, and the planetary gears are not used as input or output. The planetary gears function as idlers. This makes it possible to greatly reduce the possibility of failure.

In other words, the planetary gear mechanisms 20, 30, which are constituted of screw-like gears, are used as bearings for the rotating body whose speed is increased in the rotation transmission mechanism 15, and since they can transmit rotation without causing slippage, smearing of the bearings can be suppressed.

Modification Example 2

A rotation transmission mechanism and an assembly according to Modification Example 2 will be described.

Figures 3, 5B:
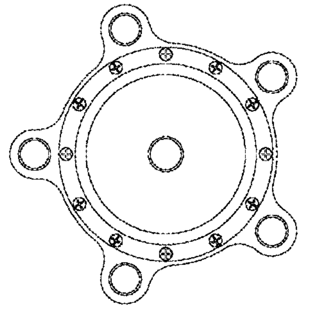
Figures 2, 5B:
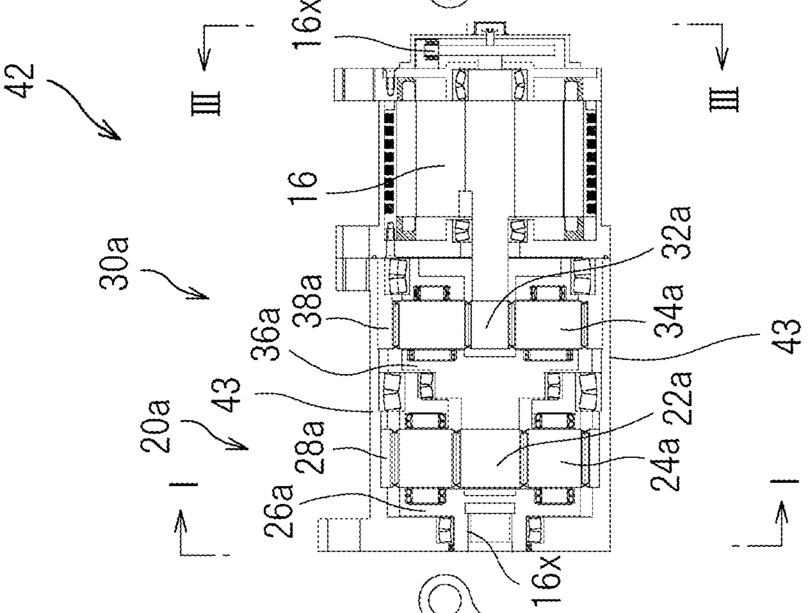
FIG. 5 is an FIGS. 5A, 5B-1 to 5B-3, and 5C are explanatory diagram diagrams of an assembly (Modification Example 2 of Example 1).
Figures 1, 5B:
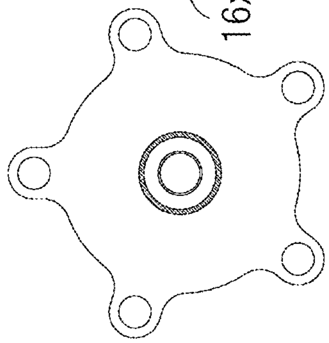
Figure 5A:
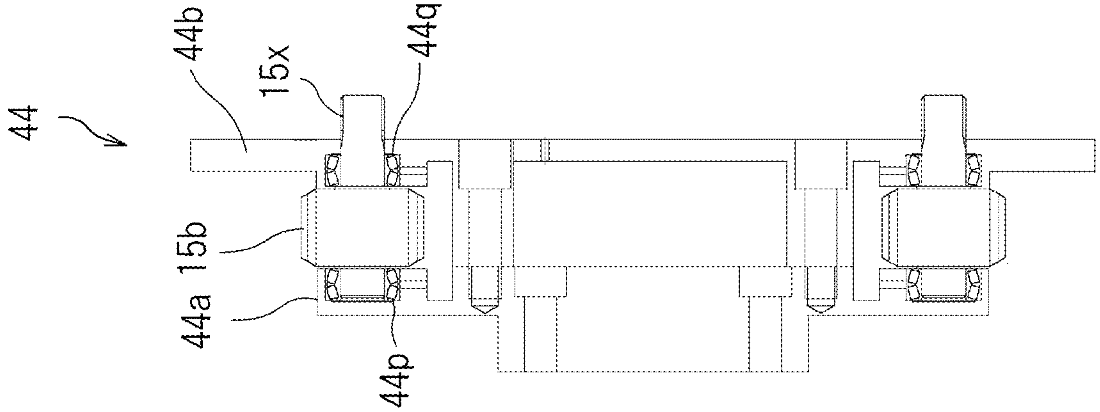

FIGS. 5A, 5B-1 to 5B-3, and 5C provide explanatory diagrams of the assemblies 42 and 44. FIG. 5A is a cross-sectional diagram of the assembly 44.

FIG. 5B-1 is a left side diagram of the assembly 42 taken along line I-I in FIG. 5B-2. FIG. 5B-2 is a cross-sectional diagram of the assembly 42. FIG. 5B-3 is a left side diagram of the assembly 42 taken along line III-III in FIG. 5B-2.

As shown in FIGS. 5B-1, 5B-2, and 5B-3, the first assembly 42 is formed by combining and integrating the first and second planetary gear mechanisms 20*a*, 30*a* constituting the rotation transmission mechanism 15 with the generator 16 and the brake 16*x*, etc. The first assembly 42 has a housing 43 that houses the first and second planetary gear mechanisms 20*a*, 30*a*.

The first and second planetary gear mechanisms 20*a*, 30*a* are composed of spur gears, and each includes a sun gear 22*a*, 32*a*, a planetary gear 24*a*, 34*a*, a planetary carrier 26*a*, 36*a*, and an internal gear 28*a*, 38*a*. A spline 16*x* is formed on the planetary carrier 26*a* of the first planetary gear mechanism 20*a*. The sun gear 22*a* of the first planetary gear mechanism 20*a* and the planetary carrier 26*a* of the planetary gear mechanism 30*a* are coupled to each other. The sun gear 32*a* of the second planetary gear mechanism 30*a* is coupled to the rotation shaft of the generator 16. The internal gears 28*a*, 38*a* of the first and second planetary gear mechanisms 20*a*, 30*a* are fixed to a housing 43 of a first assembly 42.

As shown in FIG. 5A, the second assembly 44 is formed by integrating the first and second plate-shaped holding members 44*a*, 44*b* with the external gear 15*b* disposed between them. Bearings 44*p*, 44*q* that rotatably support the rotation shaft of the external gear 15*b* are disposed in the first and second holding members 44*a*, 44*b*.

A portion of each of the external gears 15*b* protrudes radially outward from the outer periphery of the first holding member 44*a* and can engage with the ring gear 15*a*. The rotation shaft of the external gear 15*b* protrudes from the second holding member 44*b*, and a spline 15*x* is formed on this protruding portion, which can engage with a spline 16*x* formed on the planet carrier 26*a* of the first assembly 42. The second holding member 44*b* is fixed to a machine base 14*x* of the nacelle. The first holding member 44*a* may be coupled to a fixed portion 14*a* that supports the hub 12.

It is easy to supply lubricating oil to the bearings 44*p* and 44*q* of the second assembly 44. Since the bearings 44*p* and 44*q* are provided near the external gear 15*b* that receives a large force from the ring gear 15*a*, it is the most effective against failures.

Figure 6:
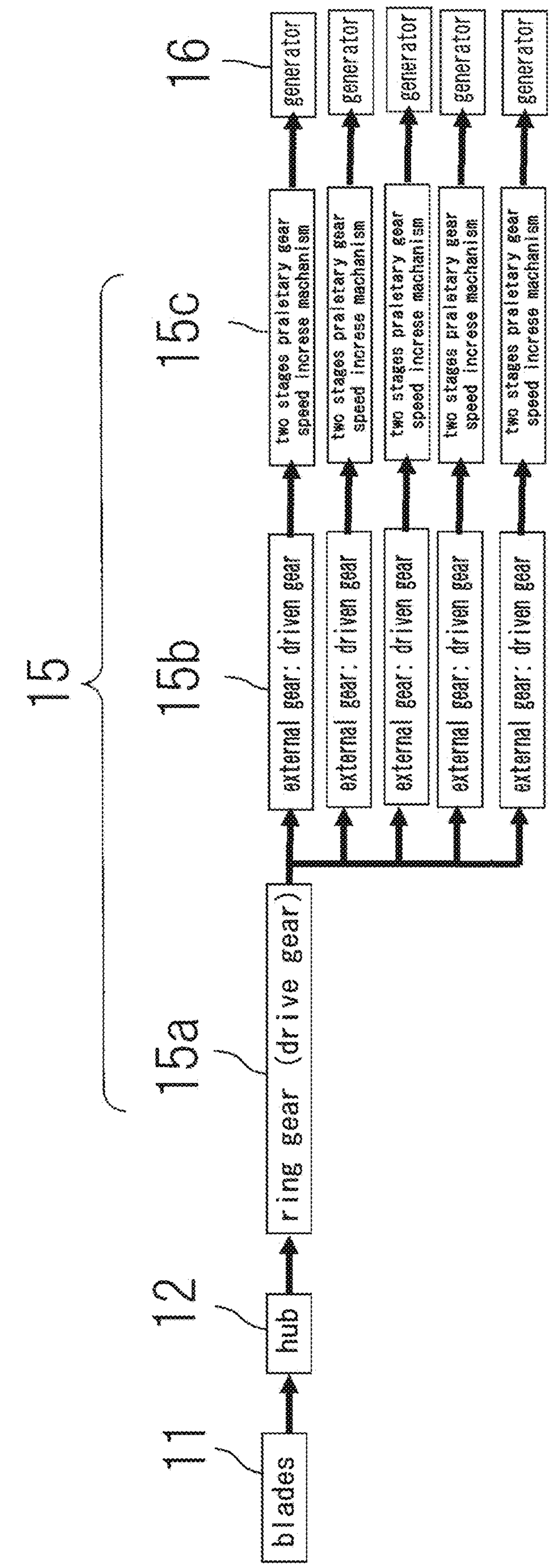
FIG. 6 is a block diagram of a wind power generation device (Example 1).

FIG. 6 is a block diagram of the wind power generation device 10. As shown in FIG. 6, the wind energy obtained by the blades 11 is branched and distributed into multiple systems by the rotation transmission mechanism 15, and is transmitted to the generators 16 of each system. By branching and distributing in this way, the wind power generation device 10 can take advantage of the increase to the 1.5-th power to achieve weight reduction.

For example, when a rotation transmission mechanism is branched into four systems, the torque of each branched system becomes ¼. Because the torque becomes ¼, the weight becomes $(1/4)^{1.5}=0.125$, or ⅛. The total weight of the four systems becomes ⅛×4=½. In other words, by branching the rotation transmission mechanism into four systems, the weight of the rotation transmission mechanism is halved.

When increasing speed simultaneously with branching, i.e. with distribution by using a ring gear or a large diameter external gear, the effect of weight reduction is further increased, resulting in extremely light weight.

Furthermore, the rotation speed decreases in proportion to the −0.5-th power of the output. To compensate for this, the diameter may be increased by the 0.5-th power. If they engage with a diameter that is $\sqrt{2}$ times larger, the increase in speed can cover the decrease in rotation speed. In other words, when trying to double the output, the diameter of a distribution type ring gear or external gear drive gear only needs to be $\sqrt{2}$ times larger, which is not proportional to the 1-st power but is $\sqrt{2}/2 \approx 0.7$ times, which is less than the increase in output.

When developing a plant that can produce large output, the absolute requirement is that the increase in size and cost must be less than the increase in output. If the output is doubled, the weight and cost must be less than doubled. Only by achieving this can the plant be made larger.

The wind power generation device 10 can fundamentally solve the problems of the conventional technology by branching and distributing.

(Method of Distribution)

When the ring gear 15*a* is used for distribution, the lubrication of the gears is improved compared to when an external gear is used instead of the ring gear 15*a* for distribution. Also, if an external gear with a parallel shaft is engaged with the inside of the ring gear, a distribution mechanism with a small overall diameter can be realized, and the size can be reduced.

On the other hand, when the drive gear is an external gear, maintenance and inspection are easier than when the drive gear is the ring gear 15*a*.

(Oil Lubrication)

The ring gear 15*a* tends to retain oil inside. In addition, as the ring gear rotates, centrifugal force acts on the oil, causing the oil to move toward the bottom of the ring gear tooth and form an oil pool. This makes it possible to supply oil to the tooth surface that engages with the external gear.

If the oil is distributed by an external gear rather than a ring gear, the oil supply is not as smooth as with the ring gear 15*a*, and so it is necessary to deal with this by drawing the oil into the bearings and gears.

(The Effect of Increasing the Speed Increase Ratio Simultaneously with Distribution)

This mechanism not only reduces torque by distributing it, but also has a large ratio of the number of teeth between the drive gear (ring gear or external gear) and the external gear (driven gear), and can simultaneously have a speed-up function with a large speed increase ratio. For example, if the speed increase ratio is 6, the torque of the external gear will be $(1/6)\times(1/4)=1/24$ of that of the ring gear, which is extremely small. However, the speed increase ratio is still 6.

In this case, the torque of the speed increase mechanism from the external gear to the generator will be $1/24$, so if the shapes are similar, the weight of one system will be $(1/24)^{1.5}=0.0085=1/117.6$. If there are four systems, the total weight of the four systems will be $(1/117.6)\times4=1/29.4$. In other words, by dividing the torque transmission and increasing the speed by distributing it between the drive gear and external gear (driven gear), the effect of reducing size and weight is extremely large.

The wind power generation device 10 has a large number of gears due to the two-stage planetary gear mechanisms 20, 30, etc., so it is slightly heavier than expected based on the 1.5-th power law, but it can be made smaller and is suitable for mass production.

While a typical wind power generation device has a speed increase ratio of around 100, the wind power generation device 10 can easily achieve a total speed increase ratio of 100 or more by accelerating the speed while distributing the power, using a small-diameter, lightweight gear mechanism, making the generator much lighter than conventional wind power generation devices.

(When Obtaining a Larger Generator Using the Same Generating Module)

If 20 MW is achieved with four distributions, and it is desired to double that to 40 MW, doubling the ring gear will double the speed increase ratio, which will increase the rotation speed, making it possible to create a structure that can obtain double the output without having to arrange eight power generation modules.

(Effect of Increased Speed)

The rotation transmission mechanism 15 realizes distribution and speed increase by the ring gear 15*a* and the external gear 15*b*. The larger the wind power generation, the slower the rotation of the hub 12. A generator 16 with a small output can generate power by directly connecting to the external gear 15*b* without increasing the rotation speed of the external gear 15*b*.

On the other hand, in a wind power generation device with a large output, the rotation speed of the hub decreases, so in order to make the generator smaller and lighter, the distributed rotation speed must be increased, for example, by adding one or two stages of a planetary gear mechanism.

However, the disadvantage of increasing the speed is that the number of parts increases, and problems specific to wind power generation arise.

In the wind power generation device 10, the stress acting on the bearing 13 that is disposed inside the hub 12 and supports the hub 12 is not the stress of a cantilever, and since the rotor is not coupled to the hub 12, the inertia is relatively small, and the failure rate is reduced. However, there are problems specific to wind power generation with the bearings and the speed increaser after speed increase, and there is a risk of damage.

(Problems Specific to Wind Power Generation)

In a typical mechanism, increasing the speed reduces the torque, which reduces the risk of malfunctioning of bearings and speed increasers. However, in wind power generation, increasing the speed has a special effect in that it amplifies the frequency fluctuations of the wind.

Assume that the torque waveform when the hub rotates is $A\cdot\cos(\omega t+1)$, where A is the torque amplitude. When the speed is increased by N times, the torque amplitude becomes (1/N) times and the frequency becomes N times, so the torque waveform becomes $(1/N)\cdot A\cdot\cos(N\omega t+1)$.

When the hub rotation is constant, it fluctuates with the wind speed. The torque fluctuation component is the derivative of the torque waveform, so when $1/N\cdot A\cdot\cos(N\omega t+1)$ is differentiated, it becomes $-A\cdot\omega\sin(N\omega t)$, and the fluctuation component does not become 1/N. Therefore, when the speed is increased, the amplitude of the basic torque waveform becomes 1/N, but the torque fluctuation component due to wind, etc., becomes $A\cdot\omega$ times, and the torque waveform changes as the fluctuation component is amplified and superimposed.

Figure 14:
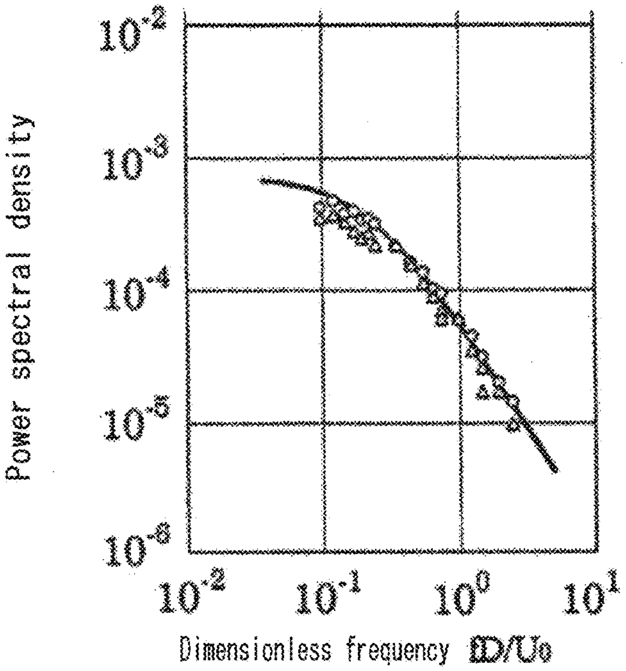
FIG. 14 is a graph of wind frequency.

FIG. 14 is a graph of the frequency distribution of wind. As can be seen from FIG. 14, wind contains components from 0.1 to several Hertz. As wind turbines become larger, the rotation speed of the hub decreases. For example, if a 20 MW wind turbine rotates at 0.1 Hz, then a 30 MW wind turbine will rotate at about 0.88 Hz.

When the wind turbine is enlarged, the fluctuations in the torque waveform are mainly affected by the wind frequency components that are higher than the hub rotation, so the effect of wind speed fluctuations becomes increasingly large.

In other words, when the speed is increased, the fluctuating components are superimposed on the torque waveform, which is the main component, and when the wind turbine is made larger and the speed increase ratio is increased, the frequency of the fluctuating components increases, increasing the number of torque fluctuations and reducing the durability of the speed increase mechanism.

(Affected Area)

Like torque, rotation also fluctuates, so in the bearings of generators after speed increase, the fluctuating components are superimposed on the main rotation. This phenomenon causes problems such as smearing, where the bearings do not rotate and rub and burn. In fact, this type of failure occurs frequently in the bearings of wind power generation devices.

The root cause of this is that bearings slide and rotate together, and they move by sliding even when they are not rotating. If the mechanism always rotates, the occurrence of smearing can be suppressed.

Not only the bearings, but also the planetary gear mechanism, which is a speed increase mechanism, is affected by the fluctuation components. In particular, in a speed increase mechanism that uses a normal planetary gear mechanism, the planet carrier is the input shaft, and the sun gear is accelerated and output. In this case, the revolution of the planetary gear around the sun axis encourages the planetary gear to rotate, so the forces acting between the planet carrier and planetary gear become complex. Therefore, when the rotation fluctuates, the bearings of the planet carrier and planetary gear are affected and often damaged.

In addition, the engaging surfaces of gears are smaller than those of bearings. For example, the engaging ratio of normal gears is 3 or less, meaning that there are three or fewer points of contact between the gears. Therefore, fluctuations in rotation are more likely to cause damage to the engaging surfaces of the gears.

Therefore, as the size of the wind power generation device increases, the possibility of damage to the bearings and gears increases.

The first and second planetary gear mechanisms 20 and 30 shown in FIG. 3 transmit rotation by engaging of screw-like gears, and are mechanisms that always rotate, so they can suppress smearing. Therefore, they are extremely effective as bearings after speed-up of wind power generation, and can reduce failures of the mechanism.

Modification Example 3

Modification Example 3 in which the large gear 15*i* (ring gear 15*i*) and the small gear 15*j* (external gear 15*j*) of the rotation transmission mechanism 15*z* are configured as screw-like gears will be described with reference to FIGS. 7 and 8.

Figure 7:
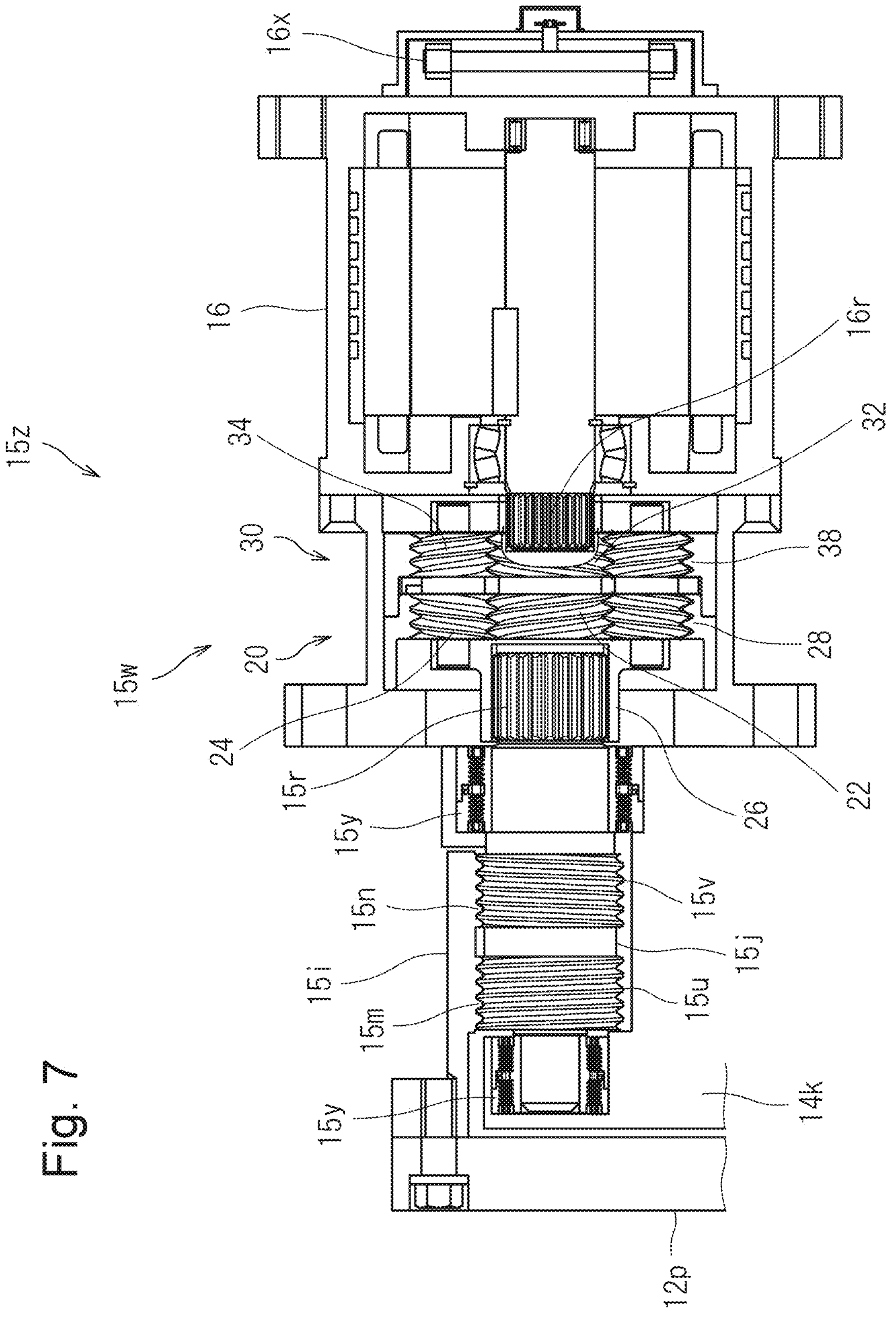
FIG. 7 is a cross-sectional diagram of a main part including a rotation transmission mechanism (Modification Example 3 of Example 1).

FIG. 7 is a cross-sectional diagram of a main part including the rotation transmission mechanism 15*z*. FIG. 8 is an enlarged cross-sectional diagram of a main part of the rotation transmission mechanism 15*z*. As shown in FIGS. 7 and 8, the external gears 15*j* of the multiple rotation transmission mechanisms 15*z* are disposed inside the ring gear 15*i* that integrally rotates with the hub 12, and the rotation of the hub 12 is distributed to multiple systems. Note that FIG. 7 shows only one system of the rotation transmission mechanism 15*z*.

The ring gear 15*i* has first and second screw-like internal teeth 15*m*, 15*n* which are internal teeth of screw-like gears twisting in opposite directions to each other. The external gear 15*j* has first and second screw-like external teeth 15*u*, 15*v* which are external teeth of screw-like gears twisting in opposite directions to each other. The first screw-like internal teeth 15*m* and the first screw-like external teeth 15*u* engage with each other, and the second screw-like internal teeth 15*n* and the second screw-like external teeth 15*v* engage with each other.

Figure 8:
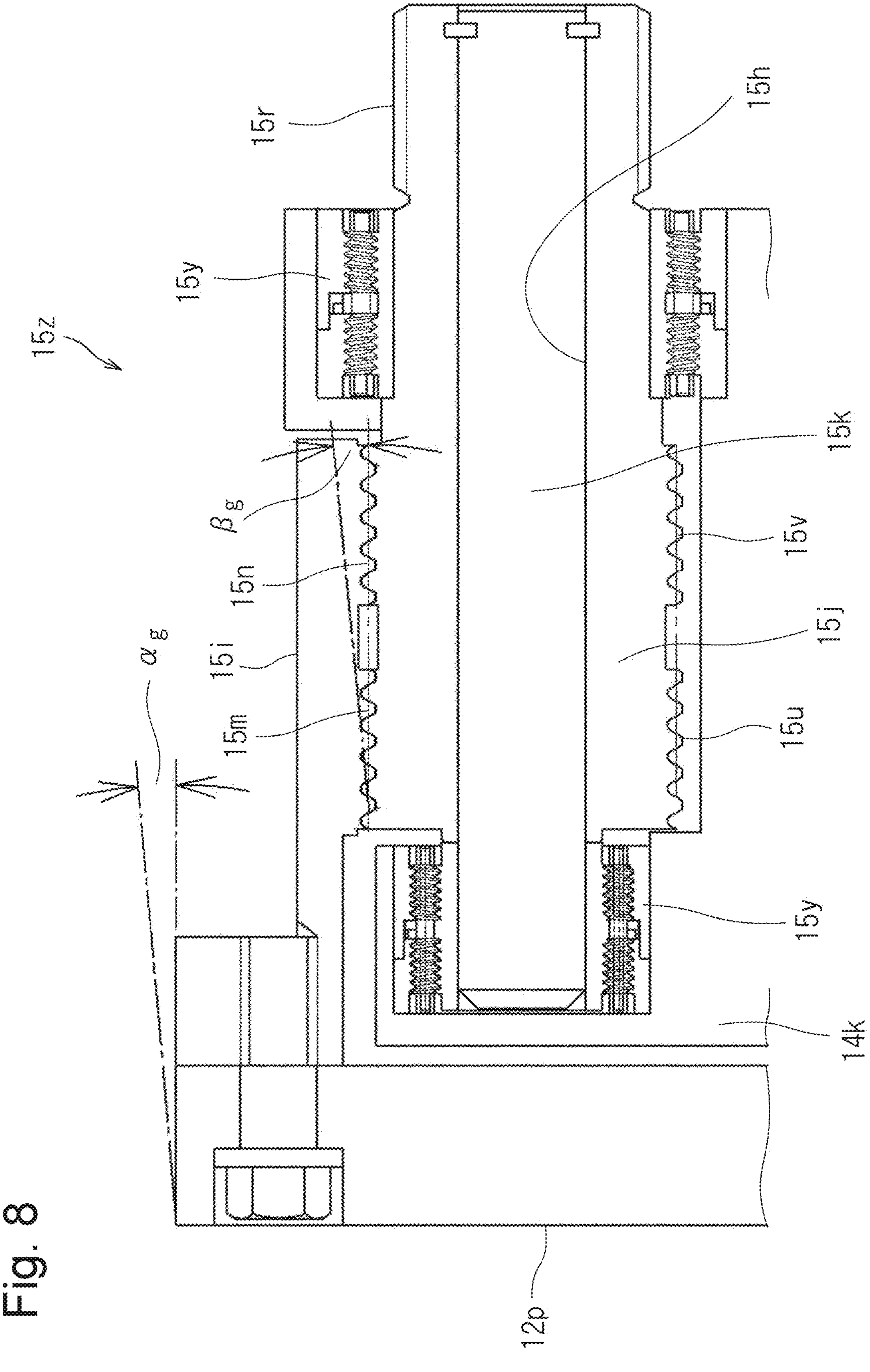
FIG. 8 is an enlarged cross-sectional diagram of a main part of the rotation transmission mechanism (Modification Example 3 of Example 1).

As shown in FIG. 8, a hollow hole 15*h* is formed in the external gear 15*j*, and a pin 15*k* is inserted and fixed in the hollow hole 15*h*. The external gear 15*j* is rotatably supported via bearings 15*y* arranged on both sides of the external gear 15*j*. The bearings 15*y* are planetary gear mechanisms constituted of screw-like gears, and are configured similarly to the bearings 15*x* shown in FIG. 4. The bearings 15*y* can suppress smearing and are highly reliable and durable. However, it is also possible to use a plain bearing, a rolling element bearing, or the like, instead of the bearings 15*y*.

The rotation of the external gear 15 *j* is accelerated by a speed increase mechanism 15 *w* and then transmitted to the generator 16.

The speed increase mechanism 15*w* includes first and second planetary gear mechanisms composed of screw-like gears, similar to the speed increase mechanism 15*c* shown in FIG. 4. The first and second planetary gear mechanisms 20, 30 include sun gears 22, 32, planetary gears 24, 34, and internal gears 28, 38, respectively. The sun gears 22, 32 are coupled to each other and rotate together. The planetary gears 24, 34 are coupled to each other, rotatably supported by the planetary carrier 26, and rotate together. The planetary carrier 26 is coupled to the rotation shaft of the small gear 15*j* via a spline, and the sun gear shaft is coupled to the rotation shaft of the generator 16 via a spline 16*r*.

By configuring the large gear 15*i* and the small gear 15*j* of the rotation transmission mechanism 15*z* as screw-like gears twisting in opposite directions to each other, the engaging ratio can be increased, and the rotation can be transmitted smoothly. In addition, the thrust force can be canceled and the thrust force acting on the rotation transmission mechanism 15*z* can be suppressed.

As shown in FIG. 8, if the inclination angle of the ring gear 15*i* is $\alpha_g$ and the allowable angle of engaging between the large gear 15*i* and the small gear 15*j* of the rotation transmission mechanism 15*z* is $\beta_g$, then by configuring it so that $\alpha_g<\beta_g$, even if the ring gear 15*i* is inclined, excessive engaging between the large gear 15*i* and the small gear 15*j* of the rotation transmission mechanism 15*z* can be prevented, thereby improving the durability and reliability of the wind power generation device.

The screw-like gears can easily increase the permissible engaging angle $\beta_g$, it is easy to configure the rotation transmission mechanism 15*z* so that no excessive force is applied to the engaging between the large gear 15*i* and the small gear 15*j*.

Modification Example 4

Figure 9:
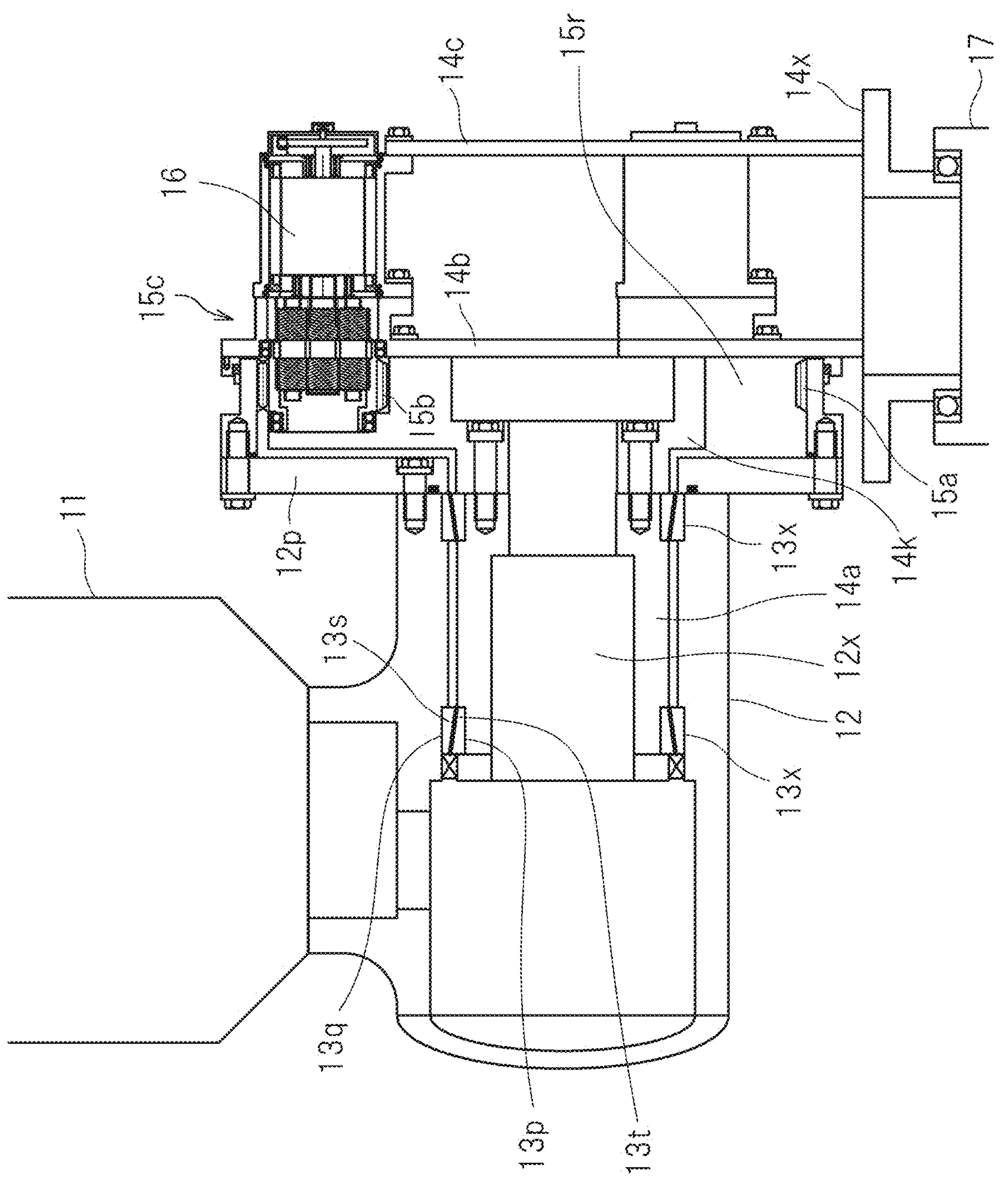
FIG. 9 is an explanatory diagram of a wind power generation device (Modification Example 4 of Example 1).
Figure 10:
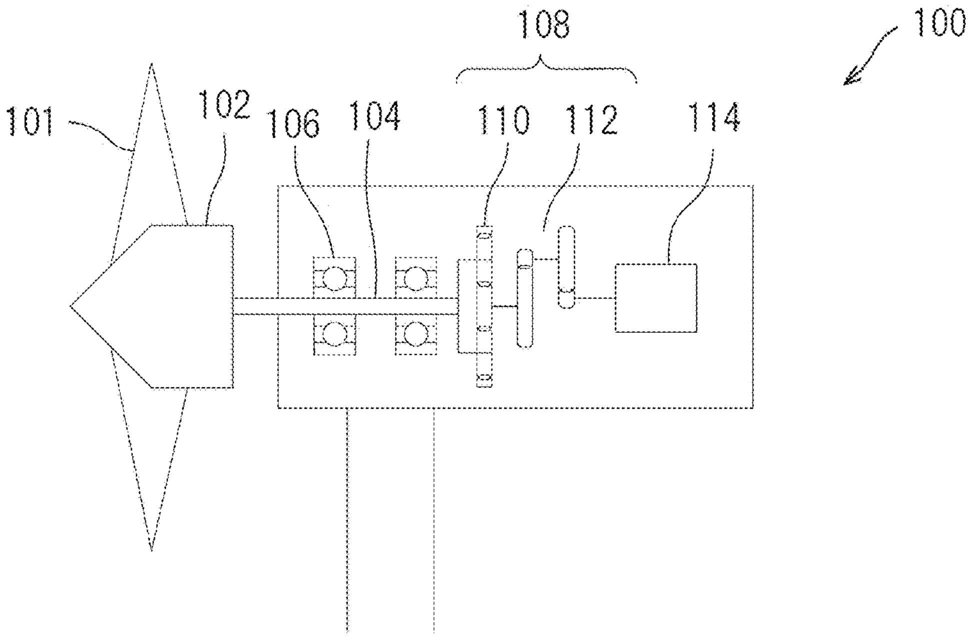
FIG. 10 is a schematic diagram of a wind power generation device (Conventional Example 1).
Figure 11:
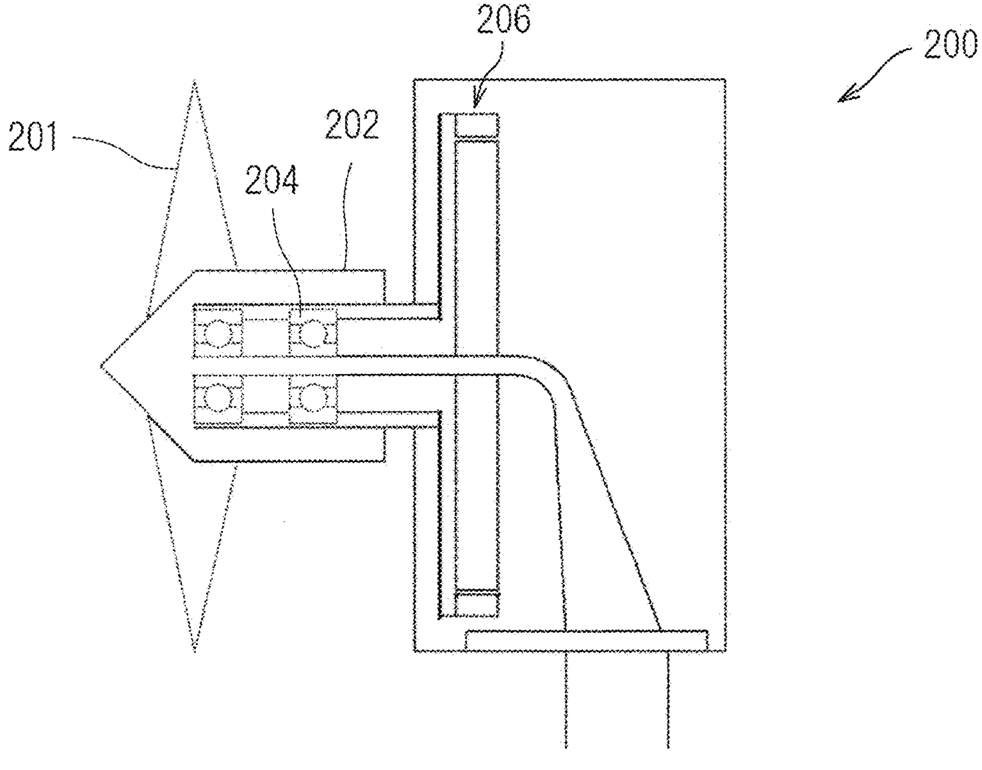
FIG. 11 is a schematic diagram of a wind power generation device (Conventional Example 2).
Figure 12A:
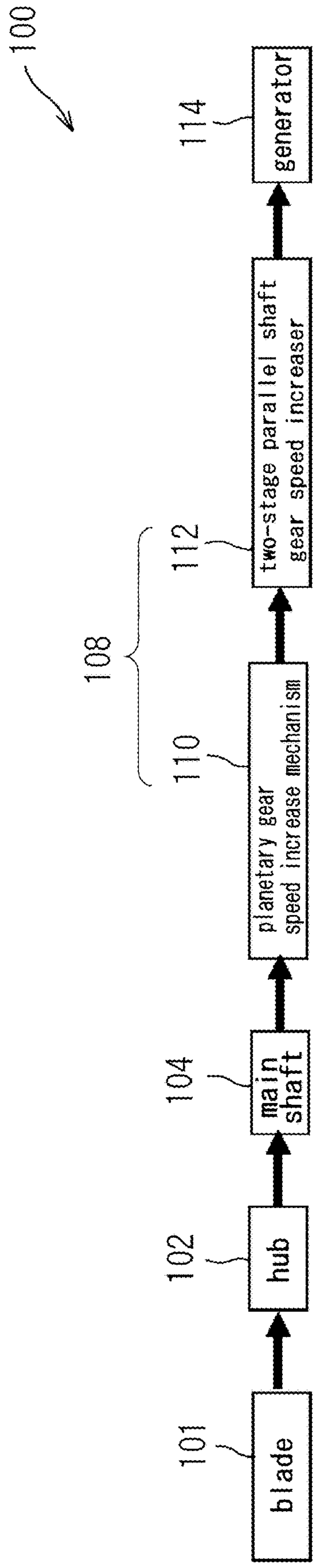
FIGS. 12A and 12B are block diagrams of a wind power generation device (Conventional Example 1, Conventional Example 2).
Figure 12B:
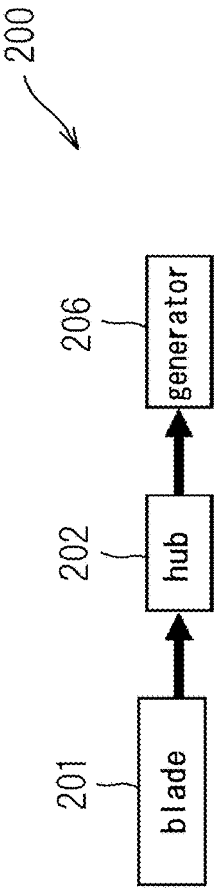

Modification Example 4 in which the bearing 13 of the rolling element bearing supporting the hub 12 in Example 1 is replaced with a bearing 13*x* of a plain bearing will be described with reference to FIG. 9. FIG. 9 is an explanatory diagram of a wind power generation device, and the same reference numerals as in Example 1 are used to designate the same components as in Example 1.

As shown in FIG. 9, the hub 12 is rotatably supported via a pair of bearings 13*x*. The bearing 13*x* includes an inner ring 13*p* and an outer ring 13*q* that are rotatable relative to one another, and the inner ring 13*p* is fixed to a fixed portion 14*a*, and the outer ring 13*q* is fixed to the hub 12.

In order to increase the load capacity of the bearing surface, a pair of bearings 13*x* having tapered (conical) bearing surfaces 13*s*, 13*t* are used, but it is also possible to use a plain bearing with a cylindrical bearing surface and provide a thrust bearing if necessary.

Plain bearings are resistant to vibration and shock loads, have a simple structure, and can be installed in a space-saving manner. However, they tend to have higher friction loss than rolling element bearing, so good oil lubrication and maintenance are essential. Currently, wind turbines are becoming larger, and the fluctuations in the wind that the blades receive cause vibration and shock loads to be applied to the main bearings, resulting in frequent failures. As a countermeasure, attempts are being made to adopt plain bearings for the main bearings.

In Example 1 and Modification Example 4, the bearings 13 and 13*x* are completely separate members from the fixed portion 14*a* and the hub 12. However, the portions corresponding to all or part of the inner rings 13*a* and 13*p* of the bearings 13 and 13*x* may be formed on the fixed portion 14*a*, and the portions corresponding to all or part of the outer rings 13*b* and 13*q* of the bearings 13 and 13*x* may be formed on the hub 14*a*. For example, the portion corresponding to the bearing surface 13*s* of the inner ring 13*p* of the plain bearing 13*x* may be formed on the fixed portion 14*a*. Also, the portion corresponding to the bearing surface 13*t* of the outer ring 13*q* of the plain bearing 13*x* may be formed on the hub 12.

The bearings 13, 13*x* that rotatably support the hub 12 may be of an appropriate type and shape and may be disposed at appropriate locations between the hub 12 and the fixed portion 12*a* of the nacelle 12. For example, they are not limited to the rolling element bearing 13 and the plain bearing 13*x*, but it is also possible to use a composite bearing, a magnetic bearing, an oil-retaining bearing, a ceramic bearing, or the like.

<Summary>

The wind power generation device described above can be made large while suppressing increases in cost.

The present invention is not limited to the above-described embodiment, but can be implemented with various modifications.

For example, the number of branches and distributions of the hub rotation and torque may be appropriately selected. Also, the configurations shown in Example 1 and Modification Examples 1~4 may be appropriately combined.

REFERENCE SIGNS LIST

10 Wind power generation device
11 Blade
12 Hub
12*x* Hollow hole
13, 13*x* Bearing
13*a*, 13*p* Inner ring
13*b*, 13*q* Outer ring
14 Nacelle
14*a* Fixed portion
15 Rotation transmission mechanism
15*a* Ring gear (large gear)
15*b* External gear (small gear)
15*c* Speed increase mechanism
15*i* Ring gear (large gear)
15*j* External gear (small gear)
15*m*, 15*n* Screw-like internal teeth
15*p*, 15*q* System
15*r* Through hole
15*s* Internal teeth
15*t* External teeth
15*u*, 15*v* Screw-like external teeth
15*x*, 15*y* Bearing
16 Generator
16*a* Converter
16*p* Drive pulse generator (control device)
16*q* Power generation command device (control device)
17 Tower
18 Floating body
19 Battery
22, 22*a*, 20*x* First planetary gear mechanism
30, 33*a*, 30*x* Second planetary gear mechanism
40, 42, 44 Assembly

The invention claimed is:

1. A wind power generation device comprising a hub in which a hollow hole is formed, a blade fixed to the hub, a bearing that includes an outer ring and an inner ring that are rotatable relative to one another, the bearing being disposed inside the hollow hole of the hub such that the outer ring integrally rotates with the hub, a nacelle that includes a fixed portion to which the inner ring of the bearing is coupled and that rotatably supports the hub via the bearing, a rotation transmission mechanism that distributes and transmits the rotation of the hub to multiple systems, a generator installed for each of the systems of the rotation transmission mechanism, to which the rotation is transmitted from the rotation transmission mechanism, and a tower that supports the nacelle in the air, wherein the rotation transmission mechanism includes a large gear that integrally rotate with the hub, and a small gear that engage with the large gear, for each of the systems;

the large gear of the rotation transmission mechanism has internal teeth or external teeth;

the small gear of the rotation transmission mechanism has external teeth that engages with the internal teeth or the external teeth of the large gear of the rotation transmission mechanism; and the large gear of the rotation transmission mechanism has a through hole communicating with the hollow hole of the hub, and the fixed portion of the nacelle is coupled to a machine base of the nacelle through the through hole.

2. The wind power generation device according to claim 1, comprising a converter installed for each of the generators, functioning as an AC-DC converter to convert alternating current generated by the generator into direct current, and a common battery to which the direct current is supplied from each of the converters.

3. The wind power generation device according to claim 2, wherein the small gear of the rotation transmission mechanism, the rotation transmission mechanism, the generator, and the converter are all or partially coupled to each other to form an assembly, for each of the systems of the rotation transmission mechanism.

4. The wind power generation device according to claim 2, further comprising a control device that controls the converter so that the generator is driven by the converter and the generator generates electricity as regenerative energy.

5. The wind power generation device according to claim 1, further comprising a housing that accommodates the rotation transmission mechanism and the generator, wherein the nacelle further includes a first longitudinal member and a second longitudinal member, fixed to the machine base;

the fixed portion is coupled to the machine base via the first longitudinal member, and the housing is fixed to the first longitudinal member and the second longitudinal member so as to transmit at least a portion of a load acting on the nacelle from the hub.

6. The wind power generation device according to claim 1, wherein the rotation transmission mechanism uses a planetary gear mechanism constituted of a screw-like gear for the bearing of a rotating body whose speed is increased by the rotation transmission mechanism.

7. The wind power generation device according to claim 1, wherein the rotation transmission mechanism includes a first planetary gear mechanism and a second planetary gear mechanism, constituted of a screw-like gear;

respective sun gears of the first planetary gear mechanism and the second planetary gear mechanism are coupled to each other and rotate integrally;

respective planetary gears of the first planetary gear mechanism and the second planetary gear mechanism are coupled to each other and rotate integrally;

the rotation of the small gear of the rotation transmission mechanism is transmitted to an internal gear of the first planetary gear mechanism;

an internal gear of the second planetary gear mechanism is fixed to the nacelle; and the rotation of the sun gear of the planetary gear mechanism is transmitted to the generator.

8. The wind power generation device according to claim 1, configured so that a worker can enter the nacelle from the bottom of the nacelle, pass through the hollow hole in the hub, and reach a position in the hub opposite the blade.

9. The wind power generation device according to claim 1, wherein the large gear of the rotation transmission mechanism has the internal teeth instead of the external teeth.

10. The wind power generation device according to claim 1, wherein the large gear of the rotation transmission mechanism has the internal teeth instead of the external teeth;

the internal teeth of the large gear of the rotation transmission mechanism include first and second screw-like internal teeth which are internal teeth of screw-like gears twisting in opposite directions to each other;

the external teeth of the small gear of the rotation transmission mechanism include first and second screw-like external teeth which are external teeth of screw-like gears twisting in opposite directions to each other; and the first screw-like internal teeth and the first screw-like external teeth engage with each other, and the second screw-like internal teeth and the second screw-like external teeth engage with each other.

11. The wind power generation device according to claim 10, wherein a planetary gear mechanism constituted of a screw-like gear is used for the bearing of a rotation shaft of the small gear of the rotation transmission mechanism.

* * * * *